United States Patent
Magley et al.

(10) Patent No.: US 10,326,518 B1
(45) Date of Patent: Jun. 18, 2019

(54) REPEATER AND NODE UTILIZATION

(71) Applicant: Mueller International, LLC, Atlanta, GA (US)

(72) Inventors: Dale McLeod Magley, Norton, MA (US); David Edwin Splitz, Sandwich, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/917,115

(22) Filed: Mar. 9, 2018

(51) Int. Cl.

| H04B 7/15 | (2006.01) |
|---|---|
| H04L 1/16 | (2006.01) |
| H04L 12/40 | (2006.01) |
| H04L 29/06 | (2006.01) |
| H04L 12/801 | (2013.01) |
| G01D 4/00 | (2006.01) |
| H04W 80/06 | (2009.01) |
| H04L 29/08 | (2006.01) |

(52) U.S. Cl.
CPC ............... *H04B 7/15* (2013.01); *G01D 4/004* (2013.01); *H04L 1/1678* (2013.01); *H04L 12/40039* (2013.01); *H04L 29/06027* (2013.01); *H04L 47/14* (2013.01); *H04L 67/04* (2013.01); *H04L 69/08* (2013.01); *H04L 69/162* (2013.01); *H04L 69/163* (2013.01); *H04W 80/06* (2013.01)

(58) Field of Classification Search
CPC ...... H04W 80/06; H04L 67/04; H04L 69/163; H04L 69/162; H04L 69/08; H04L 47/14; H04L 29/06027; H04L 12/40039; H04L 1/1678; G01D 4/004; H04B 7/15
See application file for complete search history.

(56) References Cited

U.S. PATENT DOCUMENTS

| 2006/0183421 A1* | 8/2006 | Proctor, Jr. ........ H04B 7/15521 |
| | | 455/11.1 |
| 2011/0316716 A1* | 12/2011 | MacKay ............... G04C 11/026 |
| | | 340/870.02 |
| 2014/0155705 A1* | 6/2014 | Papadopoulos ......... G06F 19/00 |
| | | 600/301 |
| 2014/0185695 A1* | 7/2014 | Kenney ............... H04L 27/2613 |
| | | 375/260 |
| 2018/0014248 A1* | 1/2018 | Splitz .................... H04W 52/02 |
| 2018/0234970 A1* | 8/2018 | Hall ................... H04W 72/0453 |

* cited by examiner

*Primary Examiner* — Jean B Corrielus
(74) *Attorney, Agent, or Firm* — Taylor English Duma LLP

(57) ABSTRACT

Methods and systems of managing communications through a repeater between a gateway and a plurality of nodes in a long-range wireless wide area network include, in various independent aspects, joining the plurality of nodes to the network through the gateway by transmitting to a join server at least a portion of join request messages received from the plurality of nodes, receiving messages from the gateway and identifying associated nodes of the plurality of nodes to which those messages are then transmitted, and transmitting messages to the gateway with physical layer payloads corresponding to payloads of messages received from the plurality of nodes.

19 Claims, 19 Drawing Sheets

REPEATER AND NODE UTILIZATION

TECHNICAL FIELD

This disclosure relates to networks, and more specifically, to data communications between devices in a network.

BACKGROUND

A utility provider, such as a gas, electricity, or water provider, among others, may have a large number of control, measuring, and sensing devices installed in the field in order to control transmission and distribution of the product, measure and record product usage, and detect problems. Such devices may include water, gas, or electrical meters, remotely controlled valves, flow nodes, leak detection devices, etc. Utility meters may have wireless communication capabilities to send and receive wireless communications with a remote communication device, enabling remote reading of meters. Advanced Metering Infrastructure (AMI), Automatic Meter Reading (AMR), and Advanced Metering Management (AMM) are systems that measure, collect, and analyze utility data using advanced metering devices such as water meters, gas meters, and electricity meters.

As the techniques for monitoring utility data continue to evolve, the use of end-devices to provide additional functionality to unsophisticated sensors has become more commonplace. A typical network may include thousands of end-devices, also known as endpoints or nodes. A node, as used herein, may refer to either a composite device in a network capable of performing a specific function, or a communication module connected to such a device and configured to provide communications for the device. Thus, for example, rather than requiring manual, human-based collection of resource measurement data from sensors placed in geographically distinct locations, nodes may report resource data to centralized locations using wired and/or wireless communications. Due to the nature of the types of resources being monitored and/or controlled, these nodes and associated sensors may be placed in remote or difficult to access locations. Consequently, it is advantageous for these end computing devices to transmit resource measurement data over longer distances.

LoRa™ RF technology from Semtech™ Corporation is one type of long-range wireless communication technology, among others, that has been developed to enable communications to be made over long distances. Long-range wireless communications may be used with devices, including sensors and actuators, for mobile-to-mobile (M2M) and Internet of Things (IoT) applications, such as industrial automation, low power applications, battery operated sensors, smart city, agriculture, metering, and street lighting. An open long-range wireless wide area network, one non-limiting example being a LoRaWAN™ network, refers to a long-range wide area network with an open standard geared toward a large number of endpoints sending relatively small amounts of data through the network to an associated host server or network server. LoRaWAN™ refers to a standard sponsored by the LoRa Alliance™.

Regardless of any particular standard, long-range wireless networks often include fairly sophisticated long-range wireless gateways for communicating with endpoints. The cost of building, deploying, and maintaining such gateways can be fairly high and is often only cost effective when it will enable a significant number of endpoints to communicate within the network. Long-range wireless network gateways forward incoming packets from endpoints to an associated server, which may be located in a cloud network, and broadcast outgoing packets received from servers. It can be difficult or impossible in many networks to choose locations for an efficient number of gateways to reach all endpoints within a geographical area.

SUMMARY

Methods and systems of managing communications through a repeater between a gateway and a plurality of nodes in a long-range wireless wide area network include, in various independent aspects, joining the plurality of nodes to the network through the gateway by transmitting to a join server at least a portion of join request messages received from the plurality of nodes, receiving messages from the gateway and identifying associated nodes of the plurality of nodes to which those messages are then transmitted, and transmitting messages to the gateway with physical layer payloads corresponding to payloads of messages received from the plurality of nodes.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawing, and claims. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

To address problems associated with using an efficient number of gateways in a long-range wireless network, such as a LoRaWAN™ network, the present disclosure provides for a repeater to reach a relatively small number of nodes (endpoints) within a particular geographical area. In addition, since AC power may not always be available, the repeater is able to efficiently operate on DC power while providing on-demand two-way communication.

Figure 1:
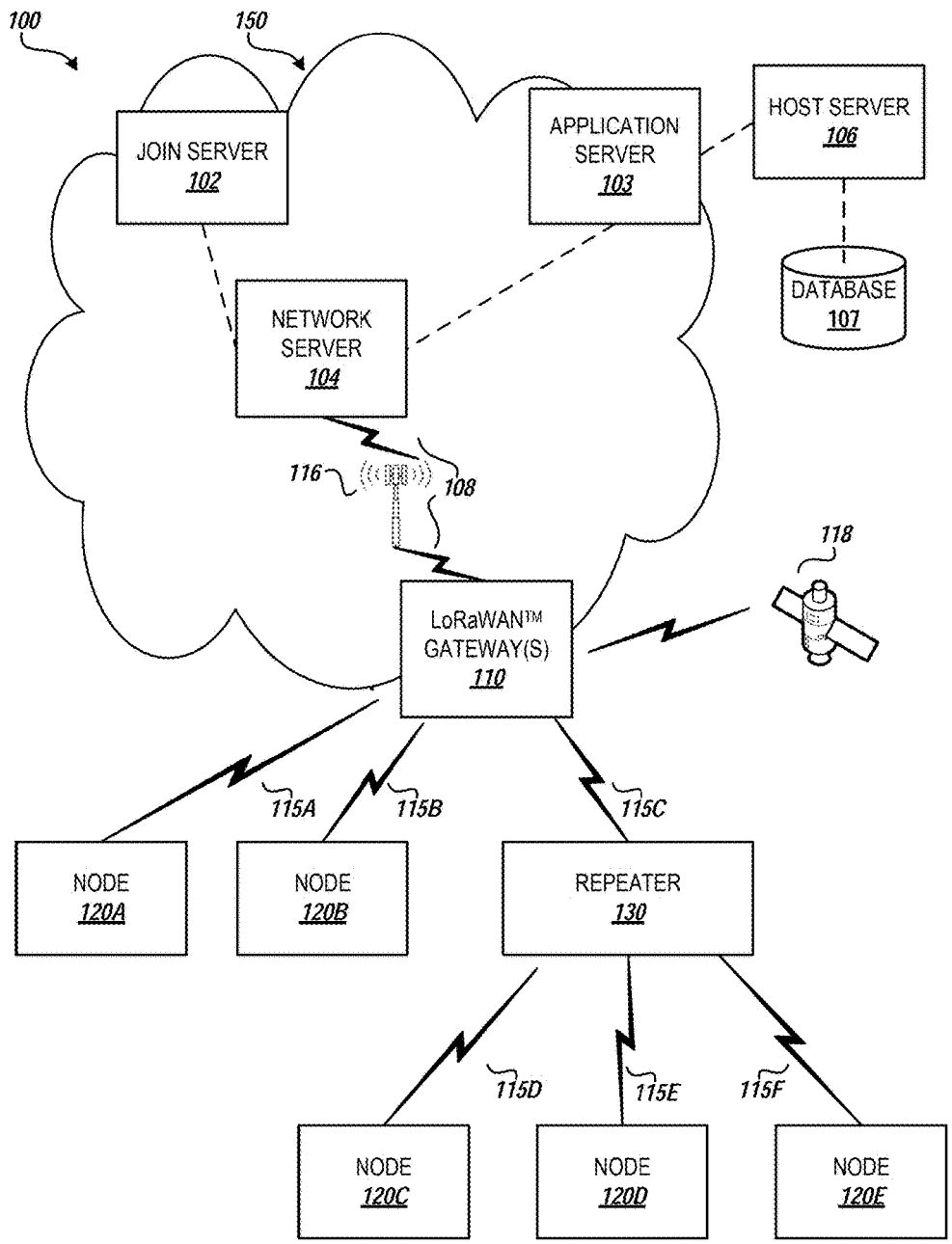
FIG. 1 is a block diagram showing one example of a network topology with nodes connected to a gateway, including a subset of nodes connected to the gateway through a repeater, according to examples of the present disclosure.

FIG. 1 is a block diagram showing one example of a network topology of an illustrative fixed communication system 100. The communication system 100 may include an independently controlled host server 106 with its database 107 connected through various networks (including secured socket Internet connection (HTTPS)) to one or more elements of a communication provider network 150, including an application server 103, which is shown connected to a network server 104, which is shown connected to a join server 102 and LoRaWAN™ gateways 110, which are connected through, in one implementation, a cellular network 116 via communication links 108. Each of the servers 102, 103, 104, which may be operated by or facilitated by the communication provider, can be implemented as one or more distributed servers and can include or access their own or other databases (not shown), and additional communication lines not shown also exist in some implementations. A utility provider may operate the host server 106 to use the communication provider network 150 (such as through the application server 103 as an interface) to collect data from, control, and manage various nodes 120A-120E (referred to herein generally as nodes 120) in the communication system 100. For example, nodes 120A-120E may be connected to (or embodied in) water meters or other utility devices and provide AMI (or other two-way connection) network communications for the utility devices. Nodes 120 may have a construction, among others, according to the description of FIG. 14, to be further described herein.

According to various embodiments, the host server 106 may effectively communicate with downlink devices, including the nodes 120 and one or more repeaters 130 through one or more LoRaWAN™ gateways 110, network server 104, and application server 103. According to some embodiments, a join server 102 may be a separate server, as shown in FIG. 1, or may be included as part of the application server 103. The communication provider network 150 may comprise various networking technologies that connect the network server 104 to the application server 103 and host server 106, including (among others) cellular data networks, Wi-Fi or WiMAX networks, satellite communication networks, metropolitan-area networks (MANs), wide-area networks (WANs), the Internet (TCP/IP), etc. The network server 104 may be connected to the LoRaWAN™ gateway (s) 110 in the field utilizing various networking technologies as a backhaul system. The backhaul system of the network, the connection between the LoRaWAN™ gateway 110 and the network server 104, may comprise ethernet, cellular (3G, 4G, 4G LTE, etc.), Wi-Fi or other wireless local area network (LAN) (IEEE 802.11), wired LAN (IEEE 802.3), satellite phone (IRIDIUM), wireless personal area network (WPAN) (IEEE 802.15), or any other telecommunications link, wired or wireless, including those identified above. As shown in FIG. 1, one implementation includes LoRaWAN™ gateway 110 connected through a cellular network 116 via communication links 108. In one example, the network server 104 can eliminate duplicate packets, schedule acknowledgements, and adapt data rates.

Repeater 130 may act as a modified or intelligent passthrough for a set of end-devices (e.g., nodes 120C-120E as shown in FIG. 1) that communicate with the LoRaWAN™ gateway 110 through various communication links 115D-115F. All of the communication links 115 may include wireless communication links, such as RF communication links, among others. In one example, the communication across the communication links 115 is two-way, but the timing and format differ between the direct communication links 115A-115C (public wireless network connections, e.g., LoRaWAN™ protocol and format) and the repeater communication links 115D-115F (e.g., private wireless network connections). The LoRaWAN™ gateway 110 may receive node data from the nodes 120A-120B and/or the repeater 130 and forward the node data to the host server 106 through the network server 104 and application server 103 or to join server 102 through the network server 104. The LoRaWAN™ gateway 110 may also forward messages received from such servers (join server 102 or host server 106) to the target node(s) 120A-120B. According to an example embodiment, the LoRaWAN™ gateway 110 may also effectively forward messages received from the host server 106 (or join server 102) to the target nodes 120C-120E via repeater 130 since the distance between the LoRaWAN™ gateway 110 and the nodes 120C-120E is typically too great (or sufficient quality communication is somehow otherwise not possible or effective) to allow direct communication between the LoRaWAN™ gateway 110 and the nodes 120C-120E. More generally speaking, in a downlink progression in which a node 120 is the ultimate recipient of a message (inclusive of any type of data communication), the message originates from an uplink source such as the host server 106. The host server 106 effectively sends originated messages to a transmitting device, such as the LoRaWAN™ gateway 110, which then sends the messages directly to certain nodes 120A-120B or (with different message payloads as instructed by the host server 106) to one or more repeaters 130, and from repeater 130, the message is effectively further sent to certain other nodes 120C-E connected through the repeater 130.

In an example in which the repeater 130 is battery (DC) powered, preferably has at least a 10-year battery life which could be easily deployed by the service provider at a relatively low cost at a fixed location. According to some embodiments, in order to meet the battery life requirements for a typical AMI network for a utility provider, the repeater 130 will need to be in its lowest power sleep state most of the time and only wake to perform required tasks. In one example, the repeater 130 may function utilizing two RF personalities, one as a LoRaWAN™ device toward the LoRaWAN™ gateway 110, and the other as a private network device, e.g., a radio frequency version 4 (RFV4) DC repeater, toward the nodes 120C-120E. The RFV4 protocol is one non-limiting example of a wireless radio frequency protocol used by Mueller Systems, and other implementations utilize other types of wireless network protocols. The repeater 130 (along with nodes 120A, 120B) may therefor communicate as part of a LoRaWAN™ network as any (class B, in one implementation) LoRaWAN™ device would, which allows the host server 106 to manage and send messages to the repeater 130. Nodes 120C-120E may also effectively, or indirectly, communicate with such a LoRaWAN™ network by sending encapsulated LoRaWAN™ messages through the repeater 130 using a private (non-LoRaWAN™) network protocol, such as RFV4. The host server 106 can send messages to the nodes 120C-120E by effectively encapsulating them in a LoRaWAN™ message to the repeater 130, where, as far as the LoRaWAN™ gateway 110 is concerned, no special features or functions are needed to be added to the LoRaWAN™ standard to support the repeater 130 function, in accordance with some example implementations.

According to some embodiments, node(s) 120C-120E and repeater 130 are able to enter a sleep mode and listen relatively intermittently for a hail from the other device. The node listening rate, which can be once every three seconds, for example, is less than, in other words "more intermittent" than, the repeater 130 listening rate, which may be once every 750 milliseconds (ms). One way to maximize battery life of a node and of a repeater powered by DC is for portions of the node or repeater to only intermittently "listen" for a hailing communication from another network device, whereby portions of the receiving device may only be powered on (i.e., "awake") for around three milliseconds to detect whether any hail messages are being sent over predefined alternating hailing channels, and if not, to power off (i.e., "sleep") for a predesignated time, such as three seconds, for example. This waking-sleeping sequence repeats, with the listening during waking moments called sniffs or sniff windows, and the interval between sniffs (in this example, three seconds for nodes) known as a sniffing interval. For example, in one implementation of the present disclosure, nodes 120C-120E may have a 3-second sniffing interval, while an infrastructure component such as the repeater 130 may have a 0.75-second sniffing interval. One way to address the differences, disclosed in U.S. patent application Ser. No. 15/206,851, filed Jul. 16, 2016, now U.S. Pat. No. 10,200,947, which is hereby incorporated by reference in its entirety, is to configure a hailing device to use a hailing implementation specifically tailored for a given sniffing interval of a target device. As disclosed in that application, hail message preamble length and spacing between the hail messages may both differ, depending on whether the target device has a 3-second, as opposed to a 0.75-second, sniffing interval.

Further, nodes 120C-120E and repeater 130 may experience a relative time drift between their respective internal time sources because even though the repeater 130 preferably periodically listens (approximately every 10 minutes, in one example) to receive a time beacon transmitted from the gateway 110 every 128 seconds (in one embodiment), the nodes 120C-120E do not receive a time synchronized beacon. According to some embodiments described herein, in order to meet battery life goals for DC powered devices and remote nodes, nodes 120C-120E are not configured to repeatedly listen for and process time beacons, which significantly improves battery life. Therefore, when a node is communicating to a repeater (e.g., nodes 120C-120E), there needs to be a method to overcome this potential time drift between each node 120C-120E and repeater 130 during hailing. As discussed in copending U.S. patent application Ser. No. 15/206,851, now U.S. Pat. No. 10,200,947, hailing messages are asynchronous with respect to listening rate of the end-device receiving the hailing message, thus the timing at which hail messages are sent is independent or asynchronous of the timing of the listening instances. Sporadic time updates may be provided to the nodes 120C-120E by the repeater 130 in occasional hailing messages in some embodiments.

In some embodiments, the nodes 120 can transmit and receive data via a long range, wide area network, for example, in accordance with a LoRa™ modulation protocol provided by Semtech, or in accordance with the LoRaWAN™ specification provided by the LoRa Alliance™. Both LoRaWAN™ and RFV4 protocols are a form of Digital Sequence Spread Spectrum (DSSS) technology. According to some embodiments, as opposed to RFV4, some other type of private network and/or protocol may be utilized. For example, in some embodiments, each node 120 can include a Gaussian Frequency Shift Keying (GFSK) or Frequency Shift Keying (FSK) link capability, or other communication physical layer and a different modulation scheme. According to some embodiments, RFV4 can be a connection-based protocol since ping/pong can be used to identify a sender and a receiver, whereas LoRaWAN™ protocol can be more of a connection-less protocol.

A LoRaWAN™ network can support various classes of communication. Class A end-devices are often battery powered, communicating with unicast messages, small payloads, long intervals, where the end-device initiates communication (uplink message). End-devices of Class A allow for bi-directional communications whereby each end-device's uplink transmission is followed by two short downlink receive windows. This Class A operation can be the lowest power end-device system for applications that only require downlink communication from the server shortly after the end-device has sent an uplink transmission. Downlink communications from a server at any other time will have to wait (and be queued) until the next end-device initiated uplink.

Class B end-devices are bi-directional with scheduled receive slots, in addition to having Class A communication abilities. Class B end-devices provide lower latency (i.e., more "on demand") communication for both unicast and multicast messages. In order for the end-device to open its Class B receive window at precisely scheduled times, it receives and uses the time synchronized beacon from the LoRaWAN™ gateway 110, as discussed above, which may be informed by time source 118. This allows the LoRaWAN™ gateway 110 to know when a Class B end-device (such as nodes 120A-120B or repeater 130) is listening. For example, a LoRaWAN™ gateway 110 may be GPS-enabled and able to receive a highly accurate time value from a GPS receiver. Other accurate time sources 118 may include a cellular network connection, an integrated accurate real-time clock component, and the like. Because the LoRaWAN™ gateway 110 may be connected to fixed power sources, these devices may be able to maintain accurate current time without the need for reduced power consumption required by downstream devices. According to an example embodiment, nodes 120A-120B and repeater 130 support Class A and Class B functionality through direct communication with the LoRaWAN™ gateway 110. Through leveraging the Class A and Class B functionality of repeater 130, nodes 120C-120E are also able to achieve latency approximating that of nodes 120A-120B without being connected directly to the LoRaWAN™ gateway 110 or being registered as Class B devices. According to some embodiments, the repeater 130 joins the network and negotiates Class B timeslots (registers as a Class B device) with the LoRaWAN™ gateway 110 after first joining as a Class A device.

If one of the nodes 120C-120E sends a message for host 106, encapsulated within the message can be the LoRaWAN™ physical layer message payload formatted essentially as if it were sent directly on the LoRaWAN™ network. Since portions of LoRaWAN™ messages are well protected by encryption, the repeater 130 cannot manipulate those portions of the LoRaWAN™ messages that it repeats. Once the repeater 130 has accepted a message from one of the nodes 120C-120E, it can then package the message by simply adding hardware preamble (i.e., preamble added by the hardware), header, and CRC and transmit it to the LoRaWAN™ gateway 110 (to be forwarded to the application server 103 for decryption and forwarding to host server 106) and then listen to receive responses at each of the Class A receive windows based on the timing of the transmission. Any responsive message that is received by the repeater 130 from the LoRaWAN™ gateway 110 during an associated window can be encapsulated within a message that is sent back to the associated node of nodes 120C-120E that recently initiated the Class A communication process. Other implementations do not use the Class A downlink path for messages from the host server 106 to the nodes 120C-120E, but instead rely only on Class B communications to the repeater 130, which can then communicate to the nodes 120C-120E. According to some embodiments, the repeater 130 does not manage the security or encryption keys for the nodes 120C-120E. As discussed herein, the encryption keys are managed by the join server 102, and are shared with the application server 103 (and with the host server 106 in some implementations). In some embodiments, both the repeater 130 and nodes 120C-120E have separate encryption keys so that, among other reasons, when a message is sent to one of the nodes 120C-120E via a repeater 130, some messages would include double encryption of some portions and single encryption of other portions, as explained below in some examples.

According to some embodiments, for Class B functionality, when the host server 106 initiates a process to send a message to a particular node of the nodes 120C-120E, the host server 106 effectively instructs the LoRaWAN™ gateway 110 (via communications to the application server 103) to encapsulate that message for the particular node of nodes 120C-120E within a LoRaWAN™ message to the repeater 130 that also includes repeater header information to identify the particular node 120-C-120E. The repeater 130 regularly monitors its assigned Class B timeslots for incoming data, and when a LoRaWAN™ message is received, the repeater 130 can interpret (including preferably decrypting) at least a portion of the LoRaWAN™ message to determine if it includes a message for one of the nodes 120C-120E, responsive to which the repeater 130 hails the particular node of nodes 120C-120E and effectively sends it the portion of the message through the communication protocol established between the repeater 130 and node 120C-120E. Consequently, the host server 106 can essentially send nodes 120C-120E messages using a method that is somewhat similar to Class B timing by instructing the LoRaWAN™ gateway 110 to encapsulate them into LoRaWAN™ messages addressed to the repeater 130, though the repeater 130 is preferably not able to decrypt the primary message for the node 120C-120E in some embodiments in which end-to-end downstream decryption of class B messages is provided by the host server 106 having access to encryption keys for the nodes 120C-120E. Further, in the exemplary embodiment, nodes directly connected to the LoRaWAN™ gateway 110 are Class B end-devices (e.g., nodes 120A,B as shown in FIG. 1) with their own negotiated Class B timeslots.

The communication links shown in FIG. 1 represent a network or networks that may comprise hardware components and computers interconnected by communications channels and protocols that enable sharing of resources and information. The network may comprise intermediate proxies, routers, switches, load balancers, etc. The paths followed by the network between the devices as depicted in FIG. 1 represent logical communication links, such as between nodes 120A-120B and the LoRaWAN™ gateway 110, or between nodes 120C-120E and the repeater 130, not necessarily the physical paths or links between and among the devices. It will be appreciated that the configuration of the network shown in FIG. 1 and described above is merely one configuration, and additional devices and/or alternative configurations may be understood by one skilled in the art based upon this disclosure. As such, the network topology shown in FIG. 1 and the network configurations described should not be seen as limiting but, instead, as an example among others.

Figure 2A:
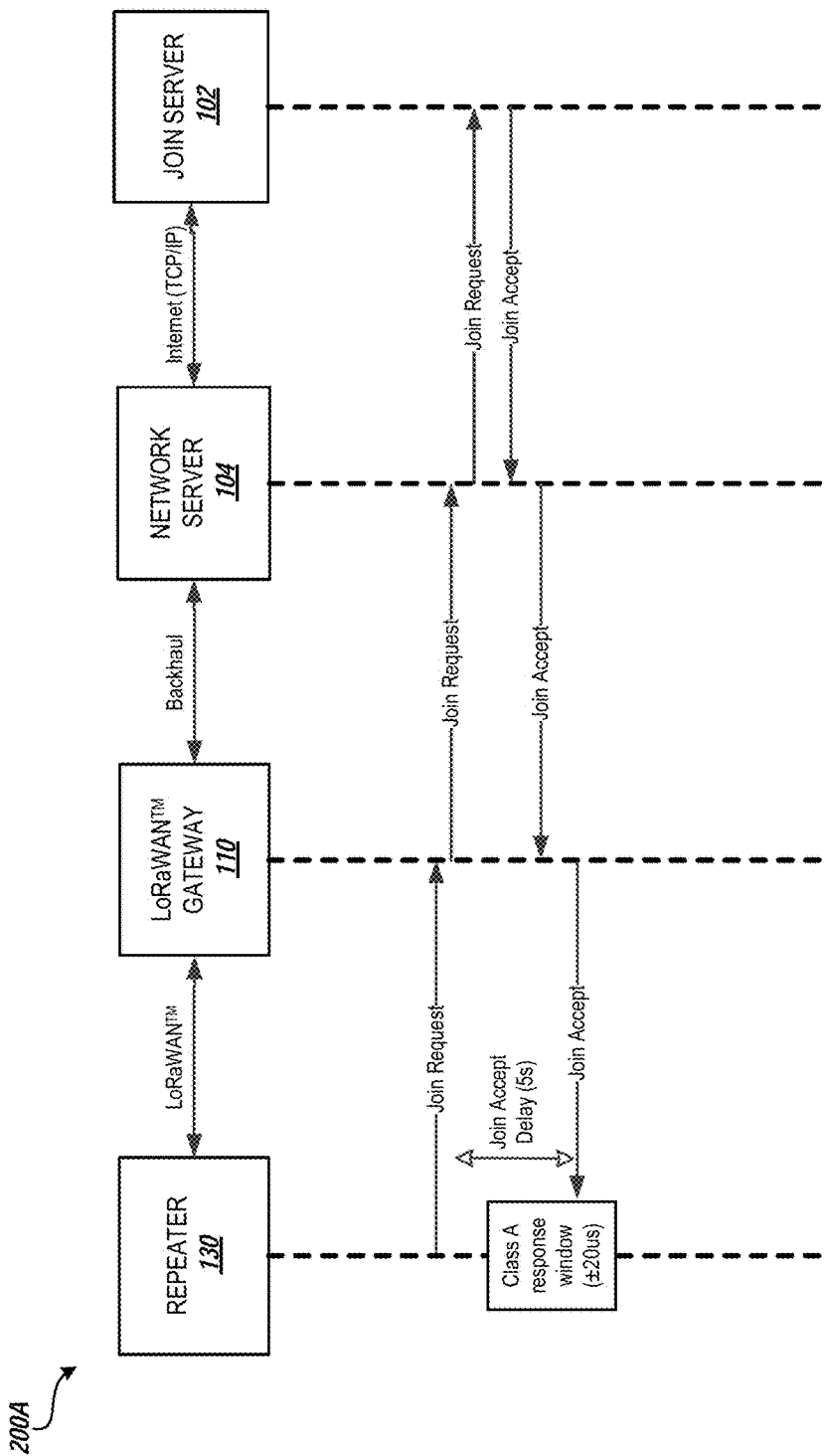
FIG. 2A illustrates a timing diagram of a method for joining a repeater to a network utilizing a LoRaWAN™ protocol, according to examples of the present disclosure.

FIG. 2A illustrates a timing diagram 200A of a method for joining a repeater 130 to a network utilizing a LoRaWAN™ protocol, according to examples of the present disclosure. A Join Request message is generated at and transmitted up from the repeater 130 to the LoRaWAN™ gateway 110, at which point it is effectively sent to the network server 104 and to the join server 102. The join server 102 may respond to the Join Request message with a Join Accept message if the repeater 130 is permitted to join the network 150, and if the repeater 130 is not permitted to join the network 150 there would be no response. The Join Accept message is effectively sent from the join server 102 to the network server 104 to the LoRaWAN™ gateway 110 to the repeater 130. A Class A response window is initiated when the repeater 130 initiated the Join Request message. The Class A response window is open at ±20 µs after a Join Accept delay of 5 seconds after the Join Request message was sent by the repeater 130. The repeater 130 is expecting a Join Accept message from the LoRaWAN™ gateway 110 via the network server 104 and the join server 102 within the Class A response window. The repeater 130 then reads and authenticates the Join Accept message by following a LoRaWAN™ end-device authentication procedure. According to some embodiments, an acknowledgment (ACK) message may be bubbled up from the repeater 130 to the join server 102 to confirm acceptance and authentication by the repeater 130. Nodes 120A-120B follow similar join processes. Subsequently, as discussed above (not shown), the repeater 130 (and nodes 120A-120B) similarly negotiate Class B time slots, prior to the nodes 120C-120E joining, as discussed below. The communication provider network 150 keeps track of which LoRaWAN™ gateway 110 is associated with each downstream device (nodes 120A-120E and repeater 130).

Figure 2B:
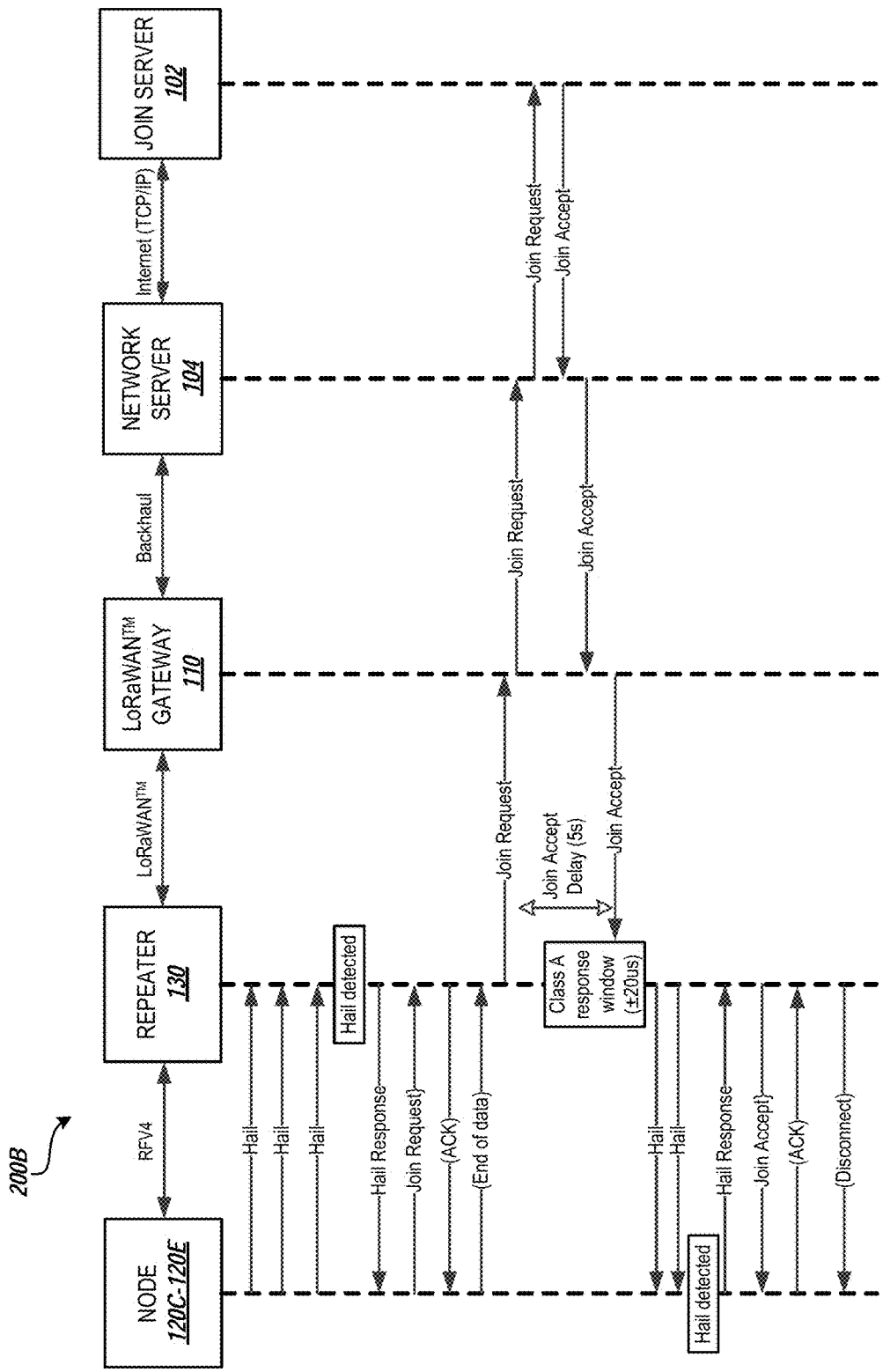
FIG. 2B illustrates a timing diagram of a method for joining a node to a network through a repeater utilizing a LoRaWAN™ protocol, according to examples of the present disclosure.

FIG. 2B illustrates a timing diagram 200B of a method for joining a node of nodes 120C-120E (also referred to herein as "node 120C-120E") to the communication provider network 150 through repeater 130, according to examples of the present disclosure. Communication is initiated by the node 120C-120E by hailing the repeater 130. After the node 120C-120E hails and receives a response from the repeater 130 via, for example, an RFV4 protocol, a Join Request message is effectively bubbled up from the node 120C-120E to the repeater 130 to the LoRaWAN™ gateway 110 to the network server 104 to the join server 102. The join server 102 may respond to the Join Request message with a Join Accept message if the node 120C-120E is permitted to join the network 150, and if the node 120C-120E is not permitted to join the network 150 there would be no response. The Join Accept message is effectively sent from the join server 102 to the network server 104 to the LoRaWAN™ gateway 110, to the repeater 130. A Class A response window is again initiated at the repeater 130 (i.e. when the repeater 130 initiated the Join Request message on behalf of the node 120A-120C). The Class A response window (which may be one of multiple windows) is shown open at ±20 µs after a Join Accept delay of 5 seconds. The repeater 130 (acting as a Class A end-device in this join process) is expecting a Join Accept message from the LoRaWAN™ gateway 110 via the network server 104 and the join server 102 within a Class A response window. The repeater 130 is therefore able to identify the appropriate node 120C-120E based upon the timing of the receipt of the Join Accept message, i.e., without reading anything in the Join Accept message itself, then hails and waits for the node 120C-120E to respond before sending the Join Accept message as an RFV4 protocol message where the node 120C-120E than reads and authenticates the Join Accept message. According to some embodiments, an acknowledgment (ACK) message may be bubbled up from the node 120C-120E to the join server 102 to confirm acceptance and authentication by the node 120C-120E.

According to some embodiments, to prevent a LoRaWAN™ gateway 110 from trying to interpret a message from a node 120C-120E behind a repeater 130, in case, for example, that node 120C-120E was able to transmit a signal strong enough to be heard by the LoRaWAN™ gateway 110, different frequency channels can be used and/or a header sync word can be used to designate a different end-device. According to some embodiments, after receiving the Join Request from nodes 120C-120E, the repeater 130 can strip out the preamble, hardware preamble, RFV4 headers, and the cyclic redundancy check (CRC), and then encapsulate the Join Request with the repeater's 130 own hardware preamble, header, and CRC. Further, the RFV4 header can be used to designate the message from node 120C-120E as a Join Request, or, since the Join Request message is in some embodiments not encrypted, the message header of the Join Request can also include a message type that could be used to identify the message as a Join Request to the repeater 130. While the Join Request message may not be encrypted, the Join Accept message may be encrypted.

Figure 3A:
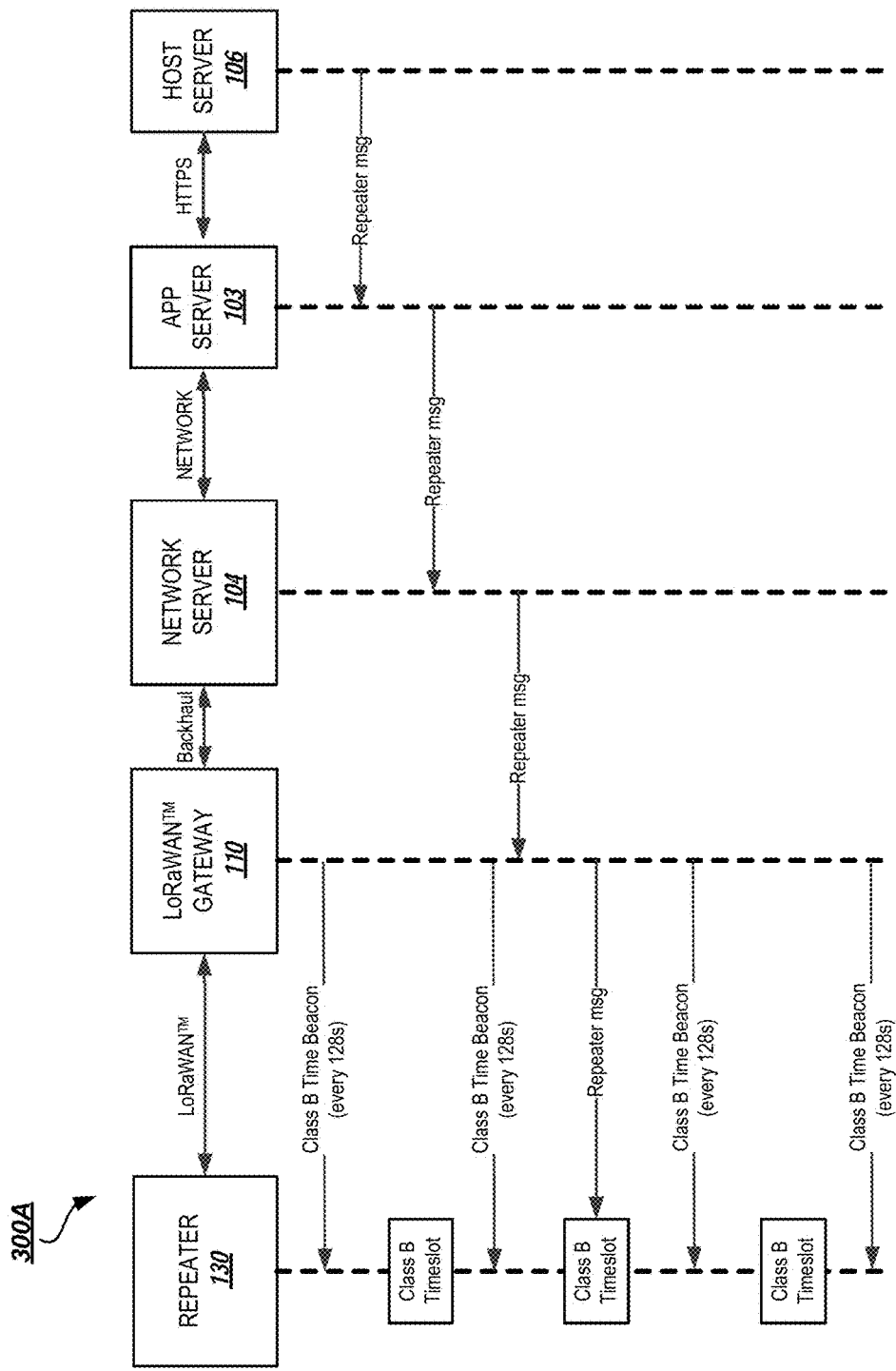
FIG. 3A illustrates a timing diagram of a method for sending a message from a host server to a repeater utilizing a LoRaWAN™ protocol, according to examples of the present disclosure.

FIG. 3A illustrates a timing diagram 300A of a method for sending an encrypted message from the host server 106 to the repeater 130 utilizing the LoRaWAN™ protocol, where the repeater 130 is accepting messages as a terminating Class B end-device, according to examples of the present disclosure. When the host server 106 initiates a process to effectively send a message to repeater 130, it sends a message to the application server 103, which is forwarded to the network server 104 and then to the LoRaWAN™ gateway 110, after which the LoRaWAN™ gateway 110 effectively sends that message using the LoRaWAN™ protocol. The repeater 130 will monitor its assigned Class B timeslot for incoming data. According to some embodiments, when a message is received from the LoRaWAN™ gateway 110, the repeater 130 determines that the message is directed to the repeater 130 itself, after which the entire message is decrypted by the repeater 130.

Figure 3B:
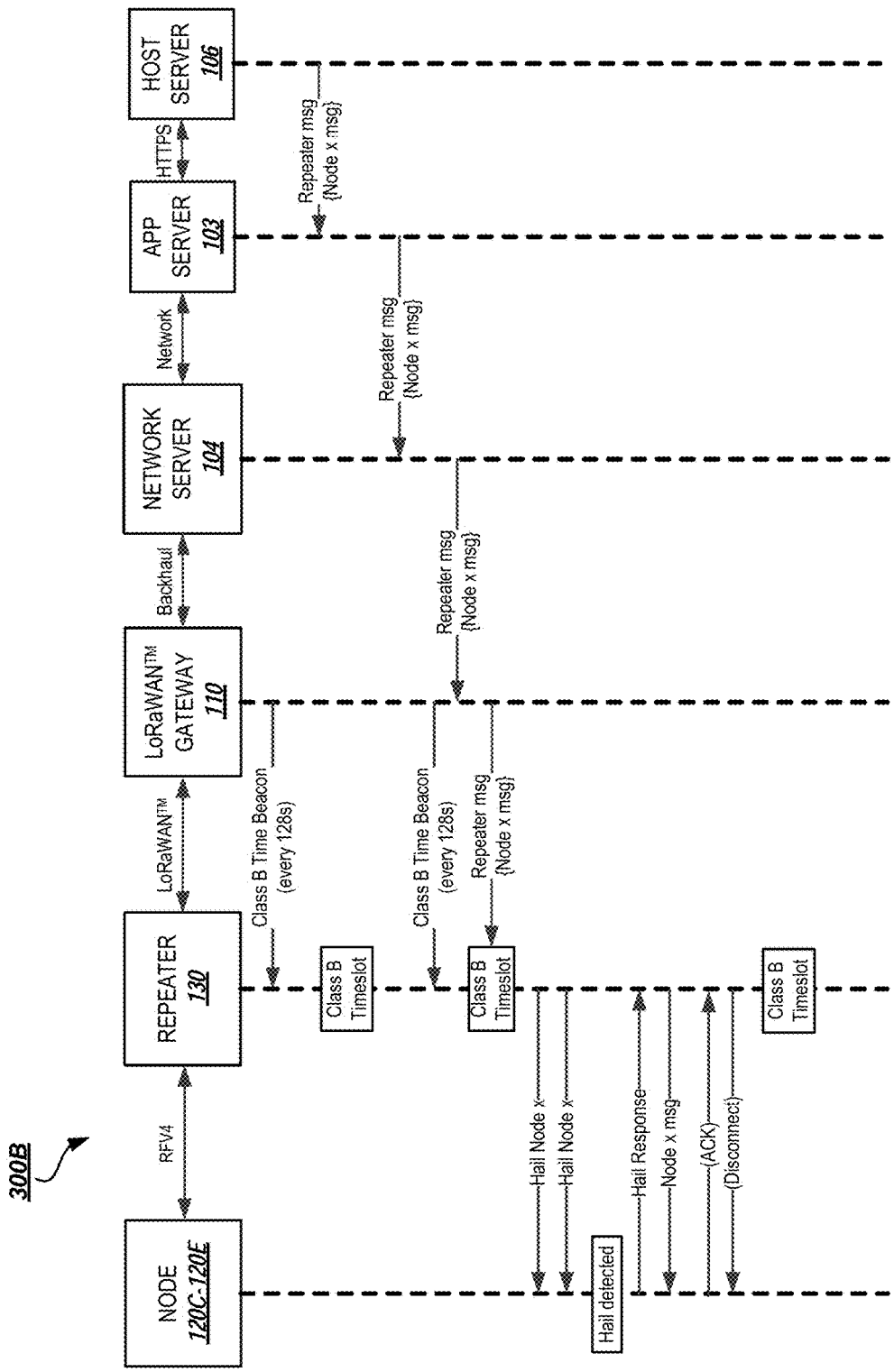
FIG. 3B illustrates a timing diagram of a method for sending a message from a host server to a node through a repeater utilizing a LoRaWAN™ protocol, according to examples of the present disclosure.

FIG. 3B illustrates a timing diagram 300B of a method for sending a message from the host server 106 to the node 120C-120E through the repeater 130, where the repeater 130 is accepting such messages as a Class B end-device, according to examples of the present disclosure. The host server 106 sends a message to the application server 103 that is addressed to the repeater 130 and includes an embedded message for a particular node "x", i.e., a node 120C-120E. The application server 103 forwards the message to the network server 104, which forwards it to the LoRaWAN™ gateway 110, which sends the message to the repeater 130 using the LoRaWAN™ protocol during an appropriate Class B time slot for the repeater 130. When the message is received by the repeater 130, it will interpret (including at least partially decrypting) a portion of the message to determine if the message is for the repeater 130 or a node 120C-120E, in which case the repeater 130 will hail the node 120C-120E and effectively pass on the message by sending it as an RFV4 message. According to some embodiments, the repeater 130 is not able to decrypt the primary portion of the message for the node 120C-120E message, but only a portion of the message in order identify the specific node 120C-120E to which the primary portion of the message should be sent.

Figure 4:
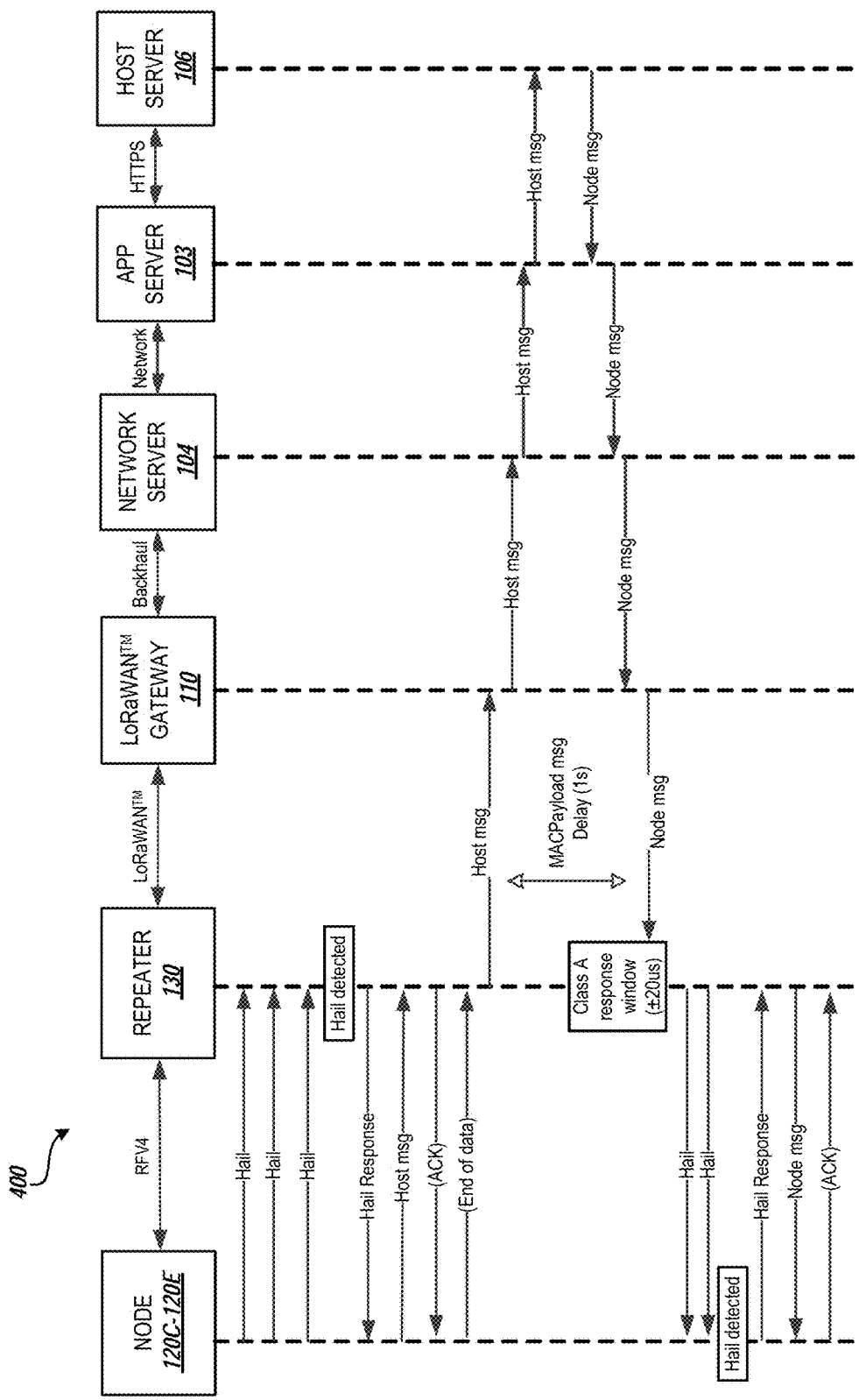
FIG. 4 illustrates a timing diagram of a method for sending a message from a node to a host server through a repeater and receiving a response utilizing a LoRaWAN™ protocol, according to examples of the present disclosure.

FIG. 4 illustrates a timing diagram 400 of a method for sending (and receiving a response to) a Class A message from a node 120C-120E to the host server 106. After the node 120C-120E hails and receives a response from the repeater 130 via RFV4 protocol, a host (uplink) message (e.g., with a MACPayload uplink PHYPayload) is bubbled up from the node 120C-120E to the repeater 130 via RFV4 protocol. The repeater 130 then takes the message and replaces the RFV4 header information with LoRaWAN™ header information, etc., and sends the message to the LoRaWAN™ gateway 110. The LoRaWAN™ gateway 110 then sends the uplink message to the network server 104 through the network server provider's backhaul, and then the network server 104 sends the uplink message to the application server 103 over the network, such as network 150 (e.g., via TCP/IP), and the application server 103 provides the message to the host server 106. The host server 106 typically responds to the host message with a node (downlink) message that is sent to the application server 103, which forwards it to the network server 104, which sends it to the LoRaWAN™ gateway 110, after which the LoRaWAN™ gateway 110 transmits it to the repeater 130. The Class A response listening window was initiated at the repeater 130, based on when the repeater 130 transmitted the host message. The Class A response window is open at ±20 µs after a delay of 1 second, in one implementation. The repeater 130 (acting as a Class A end-device) is therefore expecting a downlink response message from the LoRaWAN™ gateway 110 for a particular node 120C-120E based only on the timing of when it sent the host message. Such timing analysis can be provided in a variety of manners, including storing the host message transmission time and comparing it to the received time of a message from the LoRaWAN™ gateway 110. The repeater 130 then hails and waits for the node 120C-120E to respond before sending the downlink node message via RFV4 protocol, where the node 120C-120E can then read (decrypt, in some embodiments) and authenticate the node message. According to some embodiments, an acknowledgment (ACK) message may be bubbled up from the node 120C-120E to the host server 106 to confirm acceptance and authentication by the node 120C-120E. In addition, if the network server 104 (or other servers in network 150) needs to send a message to a node 120C-120E, it queues such a message to be sent along with any other messages to be sent during the Class A response window. In another embodiment, the host server 106 does not respond as shown in FIG. 4, but instead sends a Class B message as shown in FIG. 3B. Such an embodiment would be useful if the Class A response window is too short in some implementations.

Figure 5A:
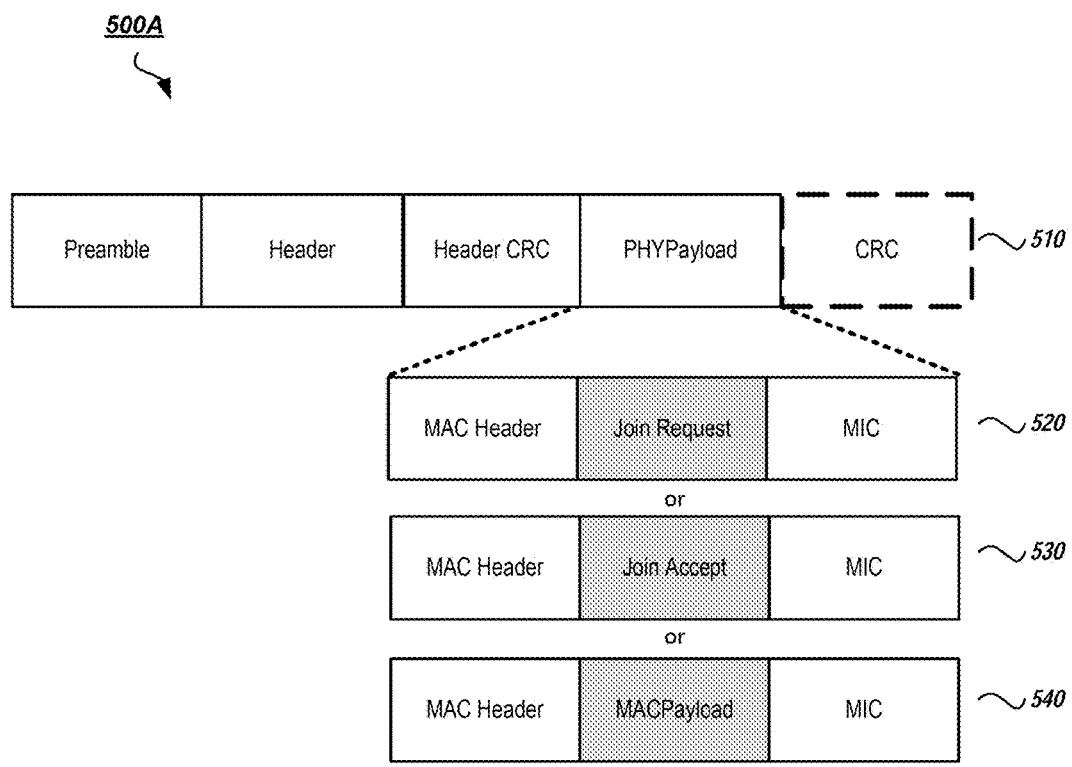
FIGS. 5A-B illustrate block diagrams of an example LoRaWAN™ protocol frame format, according to examples of the present disclosure.
Figure 5B:
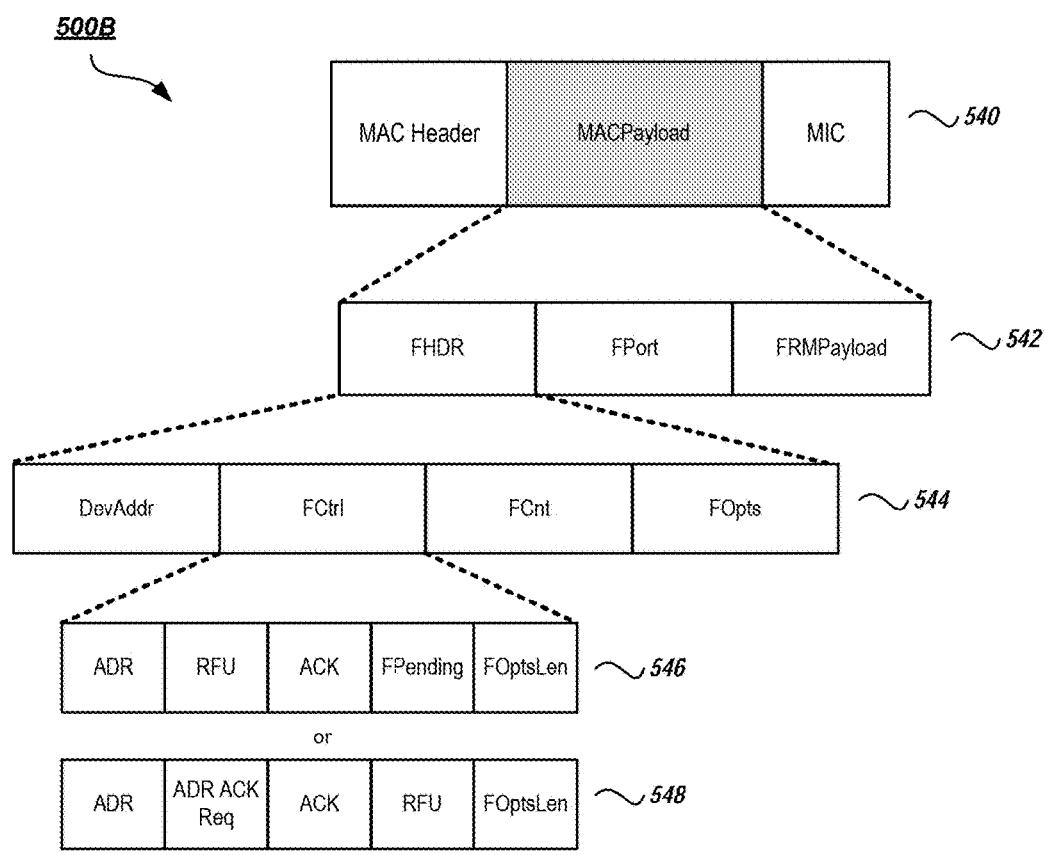

FIGS. 5A-B illustrate block diagrams of a LoRaWAN™ protocol frame format for a LoRaWAN™ message, according to examples of the present disclosure. In particular, FIG. 5A illustrates a block diagram of a LoRaWAN™ protocol frame format for the radio physical layer (PHY) structure frame format 510, which includes a preamble, a header (also known as a PHDR for physical header), a header CRC (also known as a PHDR_CRC), a PHYPayload (one type of physical layer payload, or radio layer payload), and a CRC. The LoRaWAN™ PHYPayload structure may include at least three different structures: Join Request frame format 520 for a PHYPayload of a Join Request type (also referred to herein as a Join Request PHYPayload 520); Join Accept frame format 530 for a PHYPayload of a Join Accept type (a Join Accept PHYPayload 530); and MACPayload frame format 540 for a PHYPayload of a MACPayload type (a MACPayload PHYPayload 540). The PHYPayload according to each frame format (i.e., 520, 530, 540) contains a medium access control (MAC) header field, a payload field (shown including a Join Request payload field, a Join Accept payload field, or a MACPayload payload field), and a message integrity code (MIC) field (though the MIC field for the Join Accept PHYPayload 530 may also be encrypted within the Join Accept payload field of the Join Accept PHYPayload 530). The MAC header specifies the message type (MType) and to which major version of the frame format of the LoRaWAN™ layer specification the frame has been encoded. The MIC is used for authentication of data messages to ensure data integrity within a network that uses a LoRaWAN™ protocol. Further, LoRaWAN™ protocol distinguishes between different MAC message types: Join Request, Join Accept, unconfirmed data up/down, confirmed data up/down, reserved for future usage (RFU), and proprietary. Data messages are used to transfer both MAC commands and application data, which can be combined together in a single message. A CRC, as shown with dashed lines with frame format 510 of FIG. 5A, is in one implementation only utilized on uplink messages from an end-device, and not utilized for downlink messages, per LoRaWAN™ protocol. A confirmed-data message should be acknowledged by the receiver, whereas an unconfirmed-data message does not require an acknowledgment. Proprietary messages can be used to implement non-standard message formats that are not interoperable with standard messages and should be used among devices that have a common understanding of the proprietary extensions. In an example embodiment, node messages and repeater header information are encrypted within the proprietary data message of the PHYPayload, as further discussed herein. The proprietary messages supported by the LoRaWAN™ protocol are different from other proprietary formats and protocols, such as the RFV4 discussed herein.

FIG. 5B illustrates a block diagram of MACPayload frame format 540 (which could also be referred to as a MACPayload PHYPayload, or one example of a physical layer payload, or physical layer payload field, of an uplink or downlink data message). The MACPayload field 542 of the MACPayload frame format 540 includes a frame header (FHDR) field 544, a port field (FPort), and a frame payload (FRMPayload) field. The FHDR field 544 of the MACPayload field 542 includes a DevAddr field, a frame control octet (FCtrl) field, a 2-octets frame counter (FCnt) field, and up to 15 octets of frame options in the frame options (FOpts) field. The FCtrl field of the FHDR field 544 can include either a downlink frame format 546 or uplink frame format 548. The downlink frame format 546 can include an adaptive date rate (ADR) field, an RFU field, an ACK field, a frame pending bit (FPending) field, and a frame-options length (FOptsLen) field. The uplink frame format 548 can include an ADR field, an ADR acknowledgment request bit (ADRACKReq) field, an ACK field, an RFU field, and FOptsLen field. A single data frame can contain any sequence of MAC commands, either piggybacked in the FOpts field or in the FRMPayload, and they are used by the network server 104 and the NwkSKey is thus utilized by the end-device (e.g., nodes 120A-120E, repeater 130, etc.). An FPort value of 0 indicates that the FRMPayload contains MAC commands. Piggybacked MAC commands may be sent without encryption and cannot exceed 15 octets, while MAC commands sent as FRMPayload are encrypted and cannot exceed the maximum FRMPayload length. For proprietary application specific protocols, as discussed herein with respect to the LoRaWAN™ protocol, FPort values 1-223 (0x01-0xDF) are utilized, and the AppSKey is utilized by the end-device (e.g., nodes 120A-120E, repeater 130, etc.) to decrypt the message. Further, the MIC is calculated over all the fields in the message.

Figure 6A:
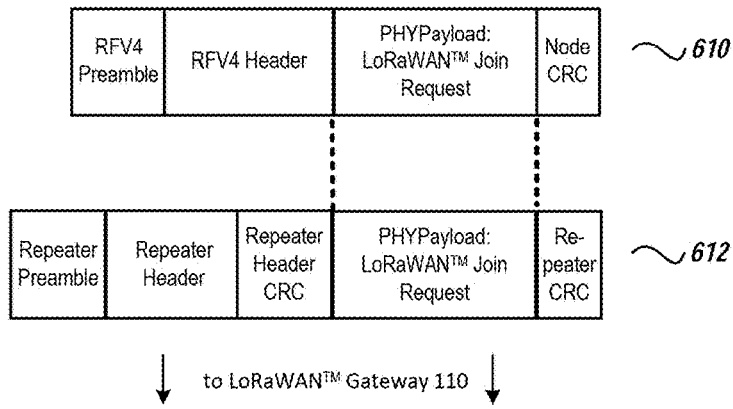
FIGS. 6A-B illustrate frame flow diagrams of frame formats of Join Request and accept processes involving a secondary protocol, radio frequency version 4 (RFV4), according to examples of the present disclosure.
Figure 6B:
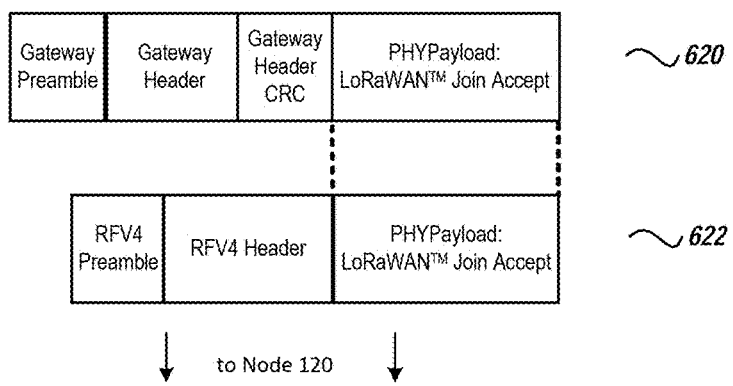

FIGS. 6A-B illustrate frame flow diagrams of frame formats of Join Request and accept processes involving a secondary protocol, RFV4, in a communication system, such as communication system 100 (FIG. 1), according to examples of the present disclosure. In particular, FIG. 6A illustrates frame flow diagram 600A of a frame format 610 for a node 120C-120E sending an RFV4 protocol message to a repeater 130 for a Join Request to a network. Within the payload field of the RFV4 node message (frame format 610) is a LoRaWAN™ Join Request message (PHYPayload), and an RFV4 header indicates to the repeater 130 that the message is to be transmitted to the LoRaWAN™ gateway 110. Thus, the message RFV4 message includes a LoRaWAN™ Join Request message encapsulated in the RFV4 message. The repeater 130 then sends as a LoRaWAN™ protocol message frame format 612 to the LoRaWAN™ gateway 110, to be forwarded as discussed above. Each frame format (610, 612) includes in the hardware physical layer a preamble, header, and since this is an uplink message, a CRC. Further, the LoRaWAN™ message in frame format 612 includes a repeater header CRC. FIG. 6B illustrates frame flow diagram 600B of a frame format 620 for a LoRaWAN™ gateway 110 forwarding a LoRaWAN™ Join Accept message to a repeater 130 for a Join Accept message for a node 120C-120E. Within the PHYPayload field of the LoRaWAN™ message (frame format 620) is the LoRaWAN™ Join Accept message. The repeater 130 then replaces the LoRaWAN™ gateway preamble, header, and header CRC with an RFV4 preamble and header to form message frame format 622 that is transmitted from the repeater 130 to the node 120C-120E, which is essentially a LoRaWAN™ Join Accept message encapsulated in the RFV4 PHYPayload. As described herein, the node 120C-120E is then able to decode the RFV4 message (frame format 622) and the LoRaWAN™ Join Accept message within the payload. Each frame format (620, 622) includes in the hardware physical layer a preamble and a header, but since this is a downlink message, no CRC at the end of the frame format.

Figure 7A:
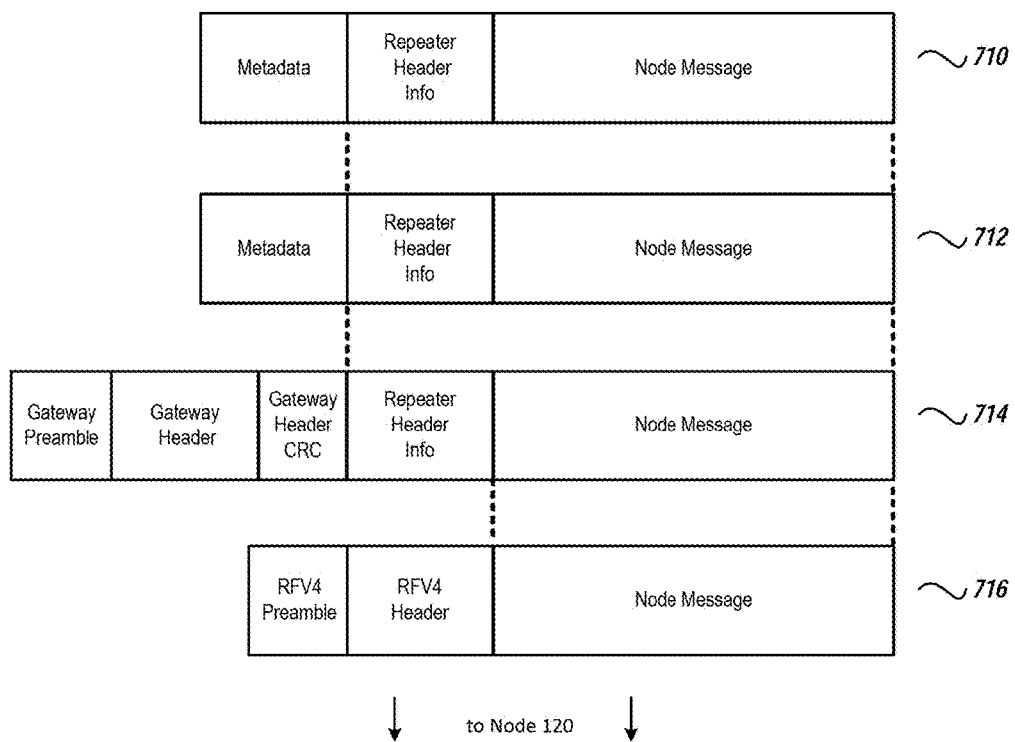
FIG. 7A illustrates a frame flow diagram of a message format from a host server to a node via a repeater, according to examples of the present disclosure.
Figure 7B:
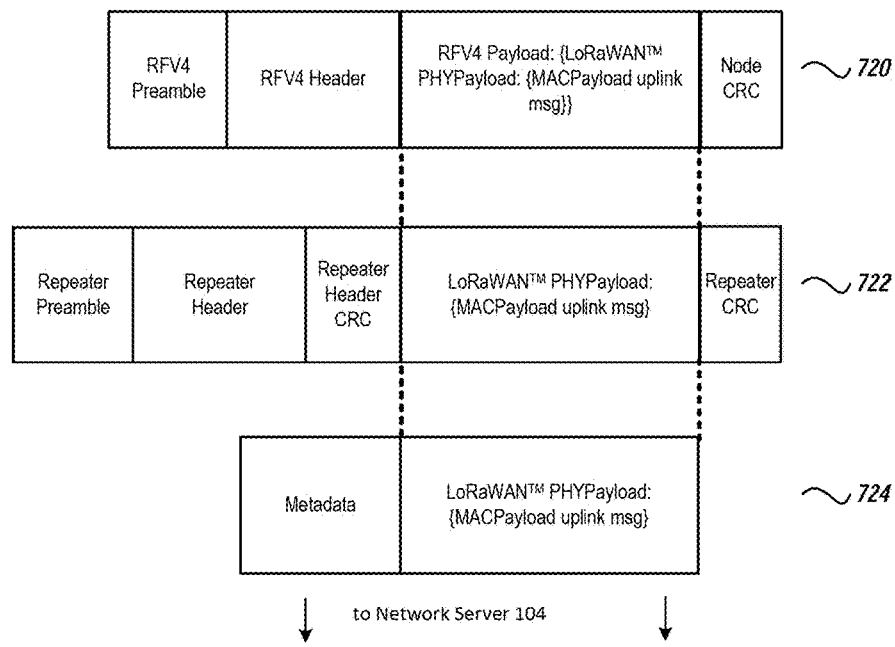
FIG. 7B illustrates a frame flow diagram of a message format from a node to a LoRaWAN™ gateway via a repeater, according to examples of the present disclosure.

FIGS. 7A, 7B illustrate frame flow diagrams 700A, 700B, respectively, of message formats in communication system 100 (FIG. 1), according to examples of the present disclosure. In particular, FIG. 7A illustrates frame flow diagram 700A of a frame format for a downlink message from host server 106 to a node 120C-120E through a repeater 130. The downlink node message is sent from the host server 106 to the application server 103 as frame format 710, from the application server 103 and then the network server 104 to the LoRaWAN™ gateway 110 as frame format 712, from the LoRaWAN™ gateway 110 to the repeater 130 as frame format 714, and finally from the repeater 130 to the node 120C-120E as frame format 716. The repeater header information and the node message intended for a specific node 120C-120E are embedded in the downlink message, and as far as the application server 103, network server 104 and LoRaWAN™ gateway 110 are concerned, is intended to be sent to the repeater 130. Consequently, the node message and repeater header info are encrypted by the application server 103 for the repeater 130 as such, and the node message (not including the repeater header info) from the host server 106 could also be encrypted by the host server 106 for the node 120C-120E for end-to-end encryption, in some embodiments, in addition to the secure socket connection (https) for all communications between the host server 106 and application server 103. The repeater 130 is able to interpret the repeater header to identify the appropriate node 120C-120E and remove the repeater header information, and send the intended node message to the intended node 120C-120E embedded in an RFV4 message. The physical layer frame format 714, a LoRaWAN™ protocol message, is shown including a (gateway hardware) preamble, header, header CRC, and MACPayload downlink PHYPayload that includes a repeater header and a node message (other elements of the PHYPayload are omitted for convenience). The physical layer frame format 716, which includes an RFV4 protocol message, is shown including RFV4 preamble, RFV4 header and the node message. One implementation includes the node message itself including a complete MACPayload downlink PHYPayload. As with other frame format diagrams in this and other drawings, additional information (not shown for the sake of clarity) may be included in the frames, and other embodiments also include alternatives that do not include one or more of the disclosed example types of information and/or include alternative ordering of the information. Metadata may be included in frames 710 and 712 to assist in moving data through the communication provider network 150. Other embodiments also include alternative encryption processes, including, for example, encrypting mutually exclusive (non-overlapping) portions of frames with different encryption, etc. In some embodiments, the frame formats shown in FIG. 7A are for Class B downlink messages (see FIG. 3B), while messages for Class A downlink messages (see FIG. 4) would not include the repeater header fields since timing alone can be used to identify the particular node 120C-120E.

FIG. 7B illustrates frame flow diagram 700B of a frame format for an uplink message from a node 120C-120E to a LoRaWAN™ gateway 110 through a repeater 130 (as discussed above with respect to FIG. 4). The uplink message ("MACPayload uplink msg") is sent through the communication system 100 from the node 120C-120E to the repeater 130 as frame format 720, from the repeater 130 to the LoRaWAN™ gateway 110 as frame format 722, and from the LoRaWAN™ gateway 110 to the network server 104 as frame format 724, which passes the message to the application server 103, network server 104, and host server 106. Within the frame format 720 is a RFV4 header to be read by the repeater 130, and the RFV4 payload is a complete LoRaWAN™ MACPayload PHYPayload, containing the at least partially encrypted uplink message. As shown, the repeater 130 extracts the MACPayload PHYPayload (or strips the RFV4 preamble, header and CRC) and encapsulates it within a LoRaWAN™ frame before sending it to the LoRaWAN™ gateway 110 as frame format 722 (including adding its own preamble, header, header CRC, and CRC, as shown). The LoRaWAN™ gateway 110 can then send the uplink message to the network server 104, which can then send the message to the application server 103 to be provided to the host server 106.

Figure 8:
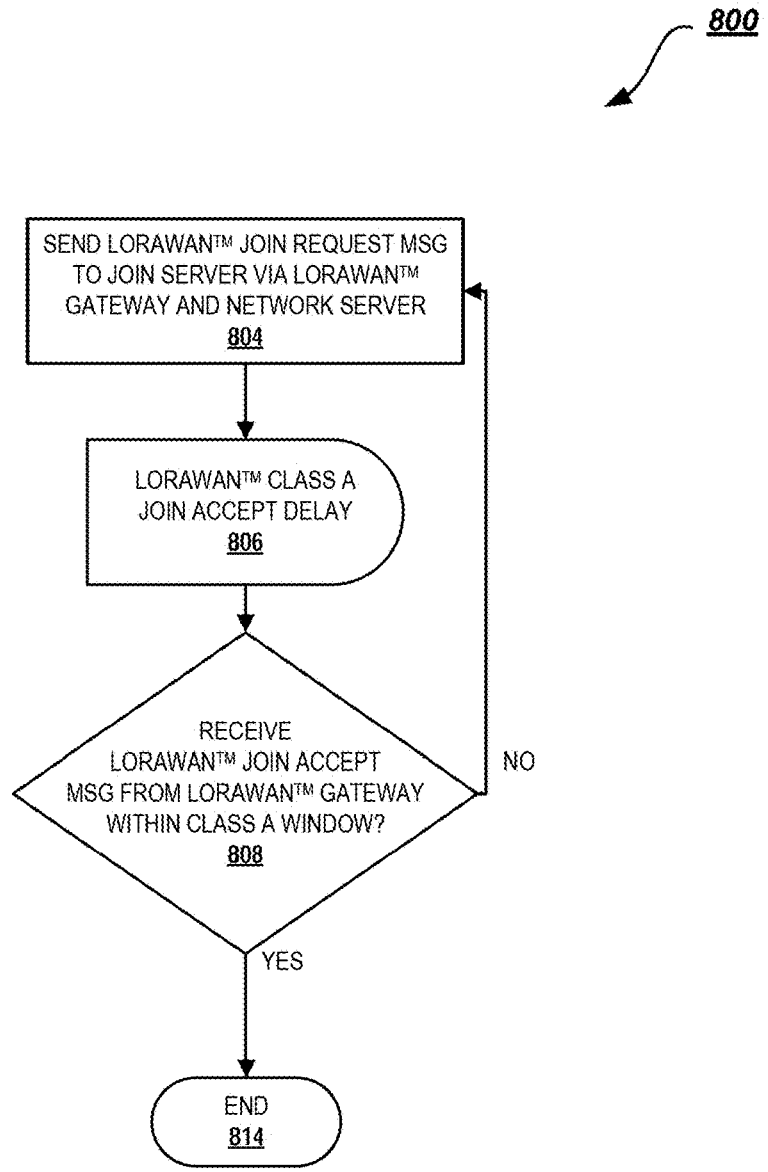
FIG. 8 illustrates a flow chart diagram of a method of joining a repeater to a network utilizing a LoRaWAN™ protocol in a communication system, according to examples of the present disclosure.

FIG. 8 illustrates a flow chart diagram of an example method 800 of joining a repeater 130 to the network 150, as previously described in FIG. 2A. Method 800 begins at block 804 where the repeater 130 sends a LoRaWAN™ Join Request message to the join server 102 via the LoRaWAN™ gateway 110 and network server 104. Next, at block 806, the repeater 130 waits 5 seconds, for example, during a Class A Join Accept delay. At decision block 808, the repeater 130 determines if a LoRaWAN™ Join Accept message is being sent from the LoRaWAN™ gateway 110 within the LoRaWAN™ Class A Window of ±20 μs. If a Join Accept message is received by the repeater 130, then the method 800 may advance to block 814 to end. If a Join Accept message is not received by the repeater 130, then the method 800 returns to block 804 to try to join again, preferably after a delay (not shown).

Figure 9:
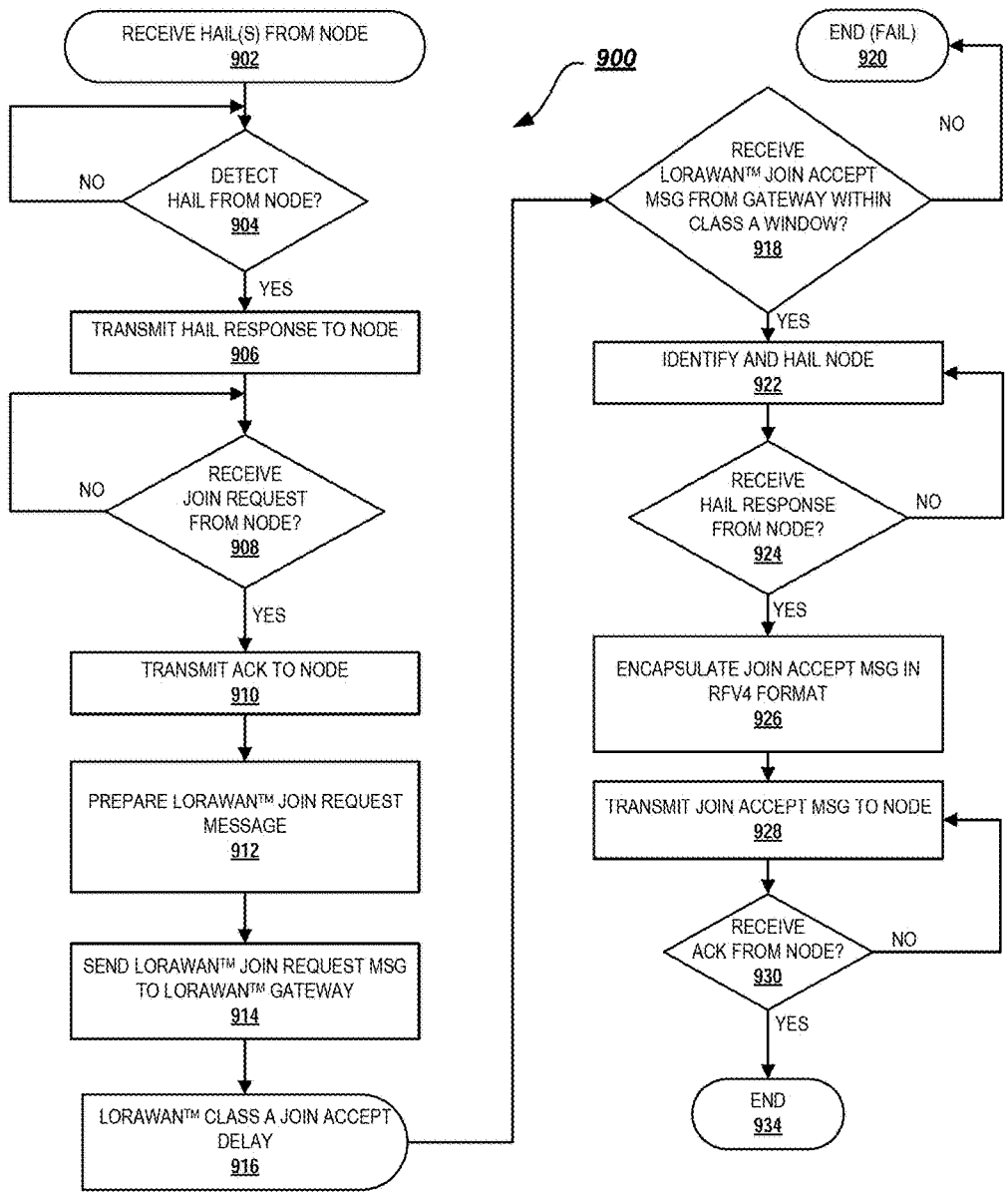
FIG. 9 illustrates a flow chart diagram of a method of joining a node to a network via a repeater utilizing an RFV4 protocol between the node and repeater, and a LoRaWAN™ protocol between the repeater and a LoRaWAN™ gateway in a communication system, according to examples of the present disclosure.

FIG. 9 illustrates a flow chart diagram of an example method 900 of joining a node (120C-120E) to network 150 via repeater 130. Method 900 begins at block 902, where a repeater 130 receives hail(s) from a node 120C-120E. In one embodiment, the repeater 130 and node 120C-120E communicate via a private network, such as through the RFV4 protocol. In further embodiments, the repeater 130 and node 120C-120E may communicate in any other communication protocol, as discussed herein. Next, at decision block 904, the repeater 130 determines if it has detected a hail message from a node 120C-120E, and if the repeater 130 does not detect a hail, the repeater 130 continues to wait. According to some embodiments, the repeater 130 is in a sleep mode and may be awakened only to listen for hail messages at predetermined intervals, such as every 750 ms, as one example. For example, the repeater 130 may awaken at set times and in sync with a Class B timeslot, where the times the repeater 130 is awake to detect hailing from a node 120C-120E, those awake times would not overlap the time it is awake to receive messages from a LoRaWAN™ gateway 110 during the Class B timeslot. In further embodiments, the repeater 130 may only awaken during the Class B timeslots in order to send/receive messages to/from a node 120C-120E and a LoRaWAN™ gateway 110 in order to increase battery life by reducing the amount of times the repeater 130 is awake to send/receive messages.

Next, if at decision block 904 the repeater 130 detects a hail message from a node 120C-120E, the method 900 continues to block 906, where the repeater 130 transmits a hail response to the respective node 120C-120E. Next, at decision block 908, the repeater 130 waits until a Join Request message from the node 120C-120E is received (otherwise timing out and ending this process, though not shown). As discussed herein, the repeater 130 may wait in a sleep mode for the Join Request message, or in the example embodiment, since the repeater 130 and node 120C-120E are in an active communication session, the repeater 130 may stay awake for a predetermined time waiting to receive the Join Request message from the node 120C-120E. Next, if at decision block 908 the repeater 130 receives the Join Request message from the node 120C-120E, the method 900 continues to block 910, where the repeater 130 transmits an ACK message in response to receiving the Join Request message from the node 120C-120E. The hailing and message communication process may remain on a non-frequency-hopping channel for data communications in some implementations, while other implementations include frequency hopping. For example, a hail message may include information enabling the recipient device to tune to a particular data channel in a defined sequence of frequency hopping data channels for continued data communications between the devices. This hailing and frequency hopping can work in both directions, i.e., when a node 120C-120E either hails or is hailed by the repeater 130.

Next, the method 900 continues to block 912, where the repeater 130 prepares the node 120C-120E Join Request message to be bubbled up to a Join Server 102 through a network utilizing a LoRaWAN™ protocol. As discussed herein, in the example embodiment, the node 120C-120E sends in the Join Request message a payload that can be used by the repeater 130 as a PHYPayload to form and transmit to the LoRaWAN™ gateway 110 a proper LoRaWAN™ Join Request message. Thus, from one perspective, a LoRaWAN™ Join Request message is in essence encapsulated within an RFV4 message from the node 120C-120E. Consequently, the repeater 130 removes or strips away anything that will not be used as it generates a regular LoRaWAN™ Join Request message. Similar processes are used whenever the repeater 130 effectively passes or repeats (encapsulates) a data message, i.e., generating and transmitting messages in relevant formats and protocols using appropriate payload data from received messages. Next, at block 914, the repeater 130 transmits the LoRaWAN™ Join Request message to the LoRaWAN™ gateway 110. The LoRaWAN™ gateway 110 sends the message to the network server 104, which sends the message to the join server 102.

Next, at block 916, the repeater 130 waits for a Class A Join Accept response delay per LoRaWAN™ protocol. According to the example embodiment, the Class A Join Accept delay is 5 seconds, and the receiving end-device, here repeater 130, listens for the Join Accept message during a Class A response window of 40 μs, which is ±20 μs after the 5 second delay. Next, at decision block 918, the repeater 130 determines if it received a LoRaWAN™ Join Accept message from the LoRaWAN™ gateway 110 during the Class A response window. In further embodiments, the Class A response window may be a different predetermined period of time. Next, if at decision block 918 the repeater 130 does not receive a LoRaWAN™ Join Accept message from the LoRaWAN™ gateway 110 within the Class A window, the method 900 may advance to block 920 where method 900 ends as a failed join to the network.

However, if at decision block 918 the repeater 130 receives a LoRaWAN™ Join Accept message from the LoRaWAN™ gateway 110 within the Class A window, the method 900 proceeds to block 922 to identify and hail the particular node 120C-120E from which it received the Join Request message that prompted the earlier LoRaWAN™ Join Request message. A variety of methods may be used in various embodiments for this determination process whereby the particular node 120C-120E is identified, including storing data associated with the identity of the node 120C-120E when transmitting the LoRaWAN™ Join Request message, scheduling listening or transmission events with node identifying information, etc. Thus, various methods can be used to identify the node 120C-120E based only upon whether a LoRaWAN™ Join Accept message is received within a predetermined window of time after a delay from when the LoRaWAN™ Join Request message was transmitted on behalf of that node 120C-120E. In addition, the repeater 130 may not in some implementation be able to determine that the message is a particular type of message, and in other embodiments all or a portion of the message may be encrypted so that the repeater is not able to know the ultimate destination of the message based upon the message itself. Furthermore, instead of (or in addition to) the previous timing analysis, other embodiments include analyzing the LoRaWAN™ Join Accept message, or variants, to identify the particular node 120C-120E. At decision block 924, the repeater 130 determines if it received a hail response from the node 120C-120E, and continues to hail the node 120C-120E at block 922 until it receives a hail response (or times out and fails, not shown). Once the repeater 130 receives a hail response from node 120C-120E at block 924, the repeater 130 at block 926 encapsulates (or converts) the LoRaWAN™ Join Accept message from the LoRaWAN™ gateway 110 into a node format as a Join Accept message, such as RFV4 protocol, as discussed above. Next, at block 928, the repeater 130 transmits the Join Accept message to the node 120C-120E, and at decision block 930, the repeater 130 waits until it receives an ACK message from the node 120C-120E. If at decision block 930 the repeater 130 receives an ACK message (or times out, though not shown), the method 900 can then proceed to end block 934.

Figure 10:
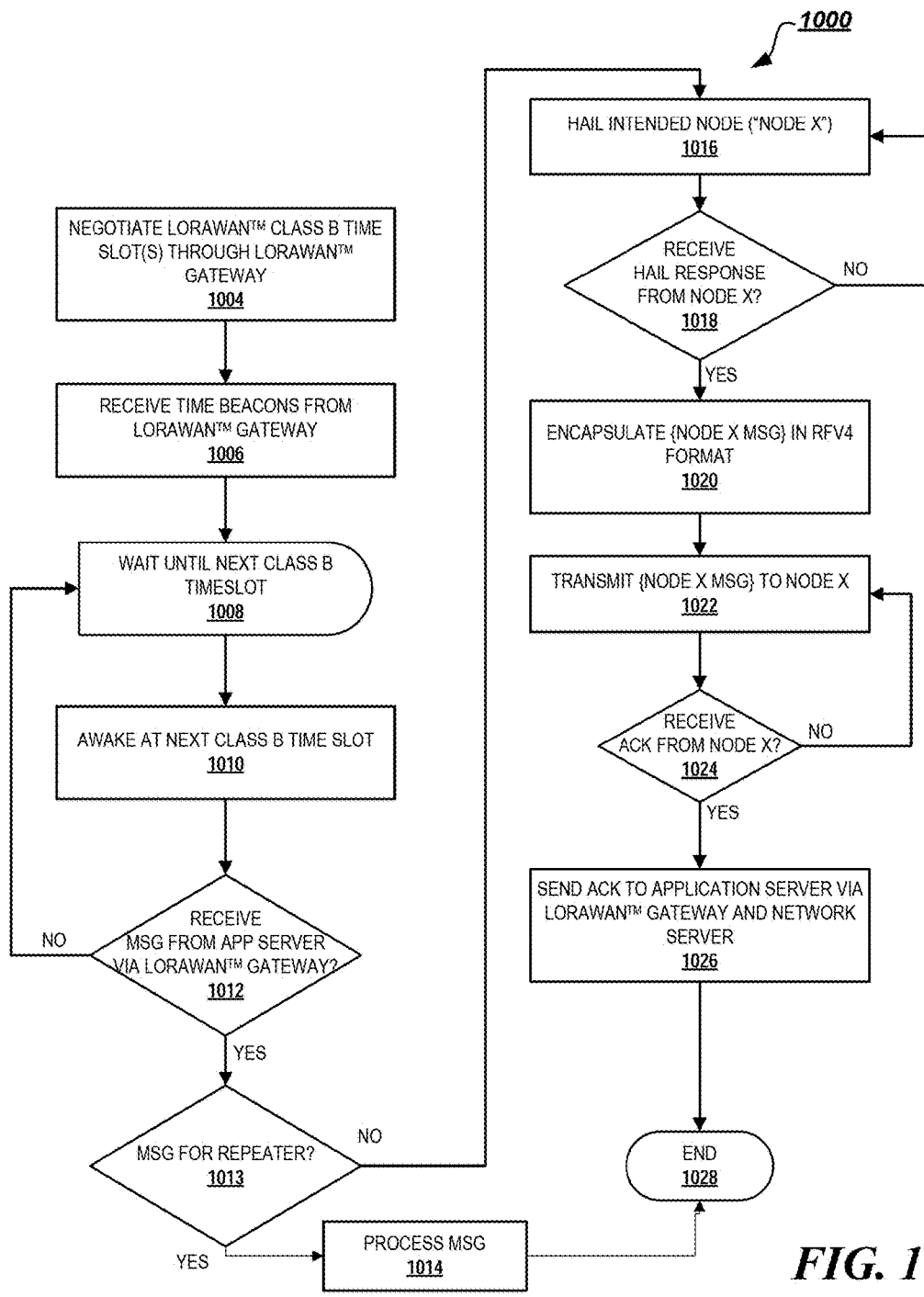
FIG. 10 illustrates a flow chart diagram of a method of sending a message to a node through a repeater utilizing a LoRaWAN™ protocol to the repeater, and RFV4 protocol to the node in a communication system, according to examples of the present disclosure.

FIG. 10 illustrates a flow chart diagram of an example method 1000 of sending a message to a node 120C-120E through a repeater 130 utilizing a LoRaWAN™ protocol to the repeater 130 and RFV4 protocol to the node 120C-120E. Method 1000 is shown beginning at block 1004 where the repeater 130 negotiates LoRaWAN™ protocol Class B timeslot(s) through the LoRaWAN™ gateway 110 (typically with the network server 104) in order to have scheduled timeslot receive windows in addition to Class A receive windows. This step 1004 typically happens only once during an initialization process but is shown here for convenience. Other embodiments include preconfigured time slots communicated out of band with network server 104. Class B end-devices, such as repeater 130, receive a time synchronized beacon from the LoRaWAN™ gateway 110, allowing the network server 104 to know when the end-device is "listening." Thus, the method 1000 continues to block 1006, where repeater 130 receives repeated time beacons from LoRaWAN™ gateway 110.

Next, in block 1008, the repeater 130 waits until the next class B timeslot (listening window), and at block 1010, awakens when the next the Class B time slot occurs. At decision block 1012, the repeater 130 determines if a message is received from the application server 103 via the LoRaWAN™ gateway 110. If no message is received from the LoRaWAN™ gateway 110, the repeater 130 returns to block 1008 and waits until the next Class B timeslot. If a message is received from the LoRaWAN™ gateway 110, then the method 1000 continues to block 1013, and the repeater 130 identifies the intended recipient for the message, including determining whether the message is for the repeater 130 (only), in which case processing continues in block 1014 for the repeater 130 and then ends at block 1028, or for a node 120C-120E, in which case processing continues at block 1016. Analysis of the message from the gateway 110 may include, in one example, at least partial decryption with the repeater 130 keys in order read a repeater header to identify the intended recipient node 120C-120E (full decryption if the message is only for the repeater 130). At block 1016, the repeater 130 hails the intended node 120C-120E, and at decision block 1018, the repeater 130 determines if a hail response is received back from the intended node 120C-120E. If no response from the intended node 120C-120E, the repeater 130 continues to hail the node 120C-120E at block 1016 until at block 1018 a hail response is received (or the process times out and ends, though not shown). Once a hail response is received at decision block 1018, the method 1000 proceeds to block 1020 where the repeater 130 encapsulates (converts) the message into an RFV4 protocol format, and at block 1022, transmits the message to the intended node 120C-120E via RFV4 protocol. Next, at decision block 1024, the repeater 130 waits until an ACK message is received from the intended node 120C-120E. If an ACK message is received, the repeater 130 than bubbles up the ACK message via LoRaWAN™ protocol to the host server 106 via the LoRaWAN™ gateway 110 and network server 104, as shown in block 1026. Method 1000 then proceeds to end block 1028.

Figure 11:
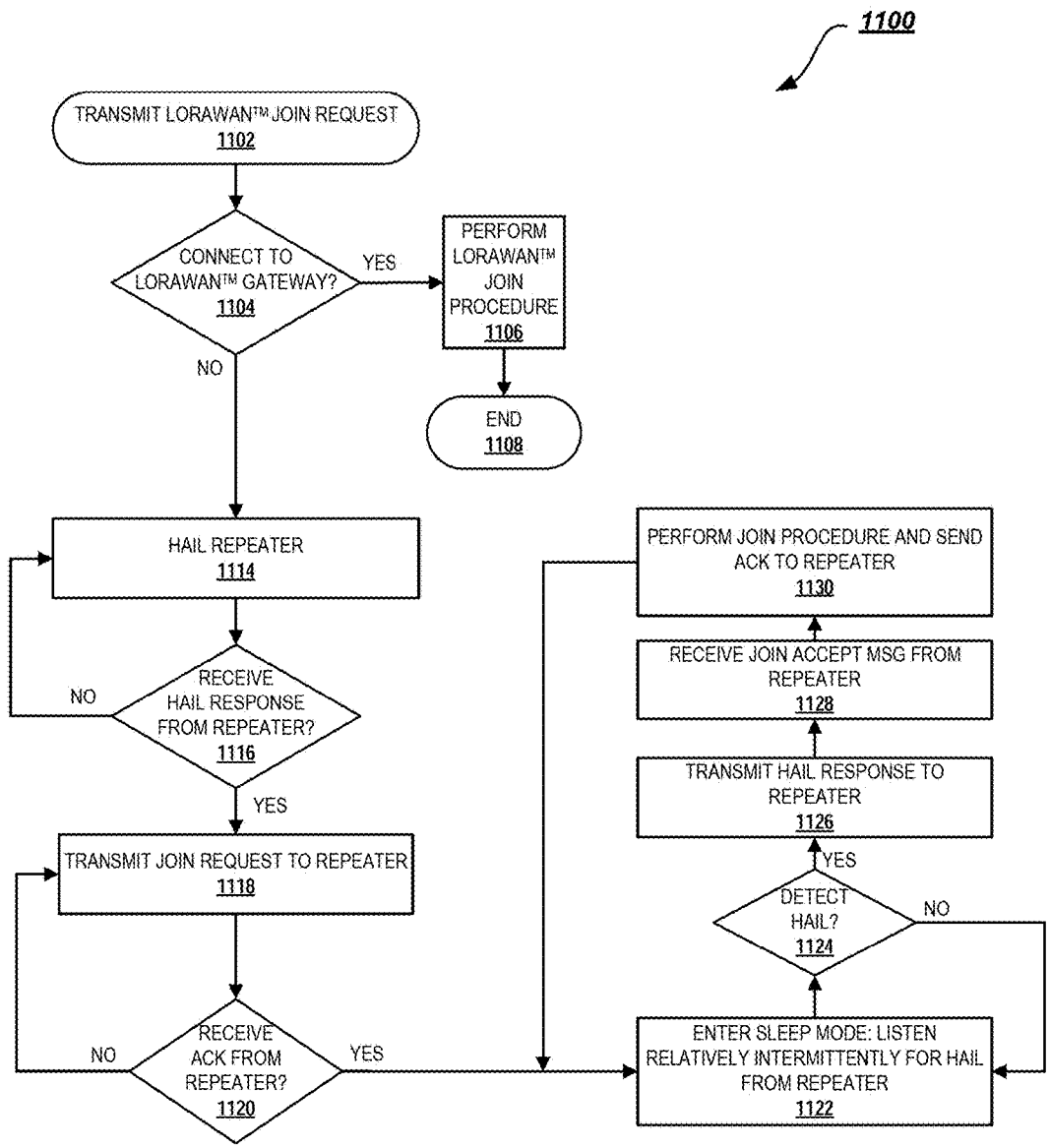
FIG. 11 illustrates a flow chart diagram of a method of a node directly joining a network utilizing a LoRaWAN™ protocol or joining a network through a repeater utilizing RFV4 protocol in a communication system, according to examples of the present disclosure.

FIG. 11 illustrates a flow chart diagram of an example method 1100 of a node directly joining network 150 utilizing a LoRaWAN™ protocol through a direct wireless connection to a LoRaWAN™ gateway or joining network 150 through a repeater 130 utilizing RFV4 protocol. Method 1100 begins at block 1102, where a node 120 transmits a LoRaWAN™ Join Request in an attempt to directly join a LoRaWAN™ gateway. Next, at decision block 1104, the node 120 determines if it can connect to a LoRaWAN™ gateway (via LoRaWAN™ protocol). If the node 120 can reach a LoRaWAN™ gateway (i.e., node 120A-120B), then method 1100 may advance to block 1106 and perform a LoRaWAN™ join procedure. Following a Join Acceptance, method 1100 may proceed to end block 1108. If the node 120 cannot directly reach a LoRaWAN™ gateway directly (i.e., node 120C-120E), then method 1100 may advance to block 1114 where node 120 (i.e., node 120C-120E) attempt a network connection through repeater 130 by hailing it. At decision block 1116, the node 120C-120E determines if it has received a hail response from the repeater 130. If no response from the repeater 130, the node 120C-120E will return to block 1114 and continue to hail the repeater 130 until the node 120C-120E receives a hail response. In some embodiments, though not shown, the node 120C-120E will time out and go to sleep mode if no hail response is received either after a certain number of hail attempts, or a predetermined time limit has been reached, after which step 1102 may begin again in some embodiments. Once a hail response from the repeater 130 is received by the node 120C-120E, method 1100 continues to block 1118, where the node 120C-120E transmits a Join Request message to the repeater 130. Next, at decision block 1120, the node 120C-120E waits for an ACK from repeater 130. If no ACK is received, the node 120C-120E continues to wait. According to some embodiments, if an ACK is not received from the repeater after a predetermined amount of time, though not shown, the node 120C-120E may enter a sleep mode, or may return to block 118 to transmit another Join Request to the repeater 130 or (not shown) to block 1114 to hail the repeater 130 again to restart the join procedure. Once an ACK is received from the repeater 130, the node 120C-120E, at block 1122, enters a sleep mode, where the node 120C-120E listens relatively intermittently for a hail from the repeater 130, as discussed above. Next, at decision block 1124, the node 120C-120E intermittently determines if it detects a hail from the repeater 130, if not the node 120C-120E returns to the sleep mode. If a hail is detected, then at block 1126, the node 120C-120E transmits a hail response to the repeater 130 and waits until the node 120C-120E receives a Join Accept message from the repeater 130 at block 1128. Next, at block 1130, the node 120C-120E performs a join procedure (i.e., authenticate and decrypt Join Accept message, etc.), and the node 120C-120E sends an ACK to the repeater 130 and loops back to block 1122.

Figure 12:
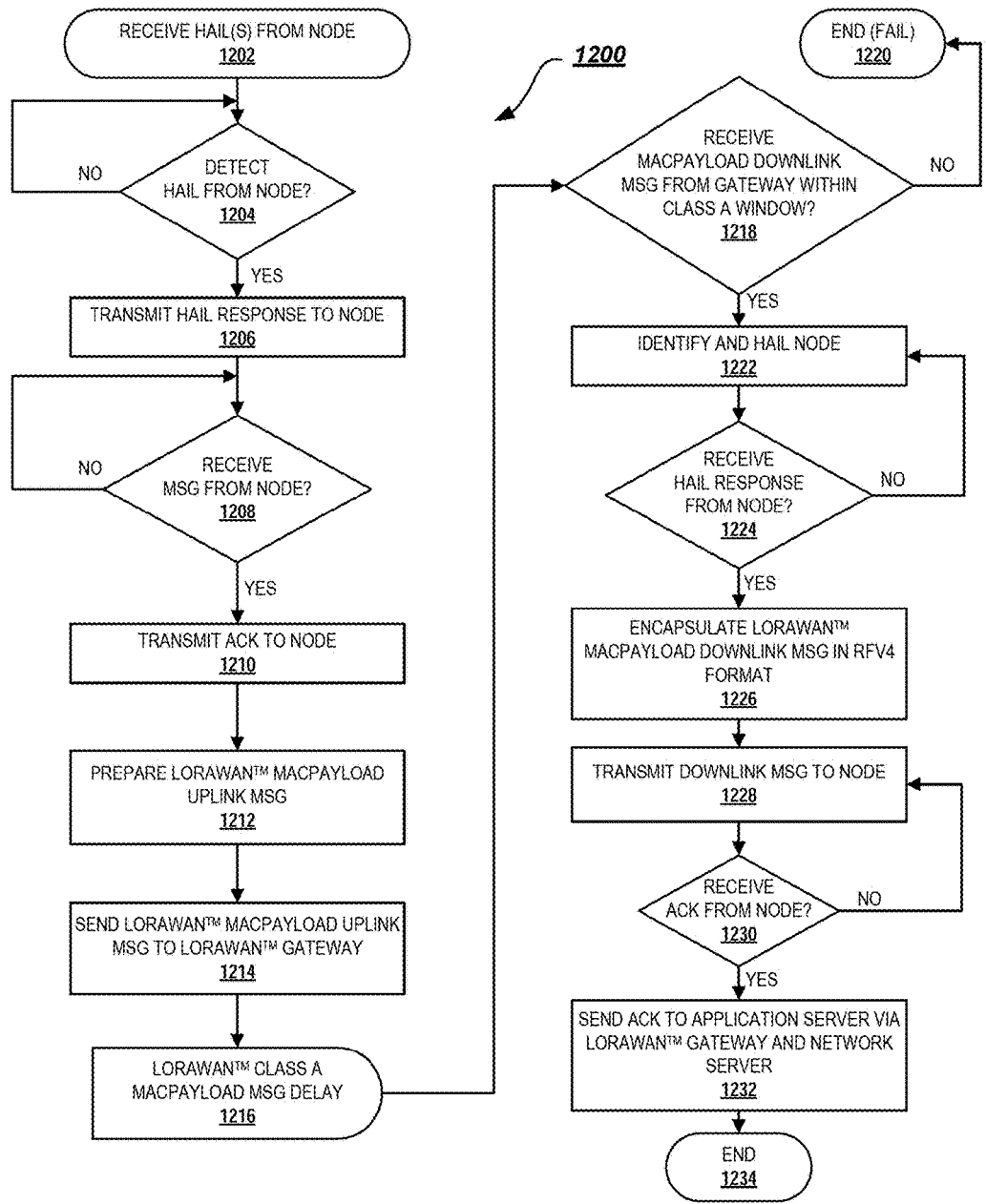
FIG. 12 illustrates a flow chart diagram of a method of a repeater sending a message and receiving a message between a node and a host server utilizing an RFV4 protocol between the node and the repeater and a LoRaWAN™ protocol between the repeater and a gateway in a communication system, according to examples of the present disclosure.

FIG. 12 illustrates a flow chart diagram of an example method 1200 of sending a MACPayload uplink message and receiving a MACPayload downlink message through a repeater 130 utilizing an RFV4 protocol between the node 120C-120E and the repeater 130, and a LoRaWAN™ protocol between the repeater 130 and a gateway 110 (as shown in FIG. 4). Method 1200 begins at block 1202, where a repeater 130 receives hail(s) from a node 120C-120E, such as in RFV4 protocol. The repeater 130 continually listens for hails from nodes, as discussed above. Next, at decision block 1204, the repeater 130 determines if it detects said hail(s), and if the repeater 130 does not detect a hail from a node 120C-120E, the repeater 130 continues to wait. According to some embodiments, the repeater 130 is acting as a Class A end-device, and may be in a sleep mode and awakened by the hail(s) from node 120C-120E. In some embodiments, the repeater 130 awakens at predetermined times to detect hailing from the node 120C-120E. In addition, the repeater 130 may also function as a Class B end-device and may awaken at set times and in sync with a Class B timeslot, where the times the repeater 130 is awake to detect hailing from the node 120C-120E would not overlap the time it is awake to receive messages from a LoRaWAN™ gateway 110 during the Class B timeslot. In further embodiments, the repeater 130 may only awaken during the Class B timeslots in order to send/receive messages to/from the node 120C-120E and a LoRaWAN™ gateway 110 in order to increase battery life by reducing the amount of times the repeater is awake to send/receive messages.

Next, if at decision block 1204 the repeater 130 detects the hail(s) from the node 120C-120E, the repeater 130 transmits a hail response to the node 120C-120E from which it received the hail block 1206. Next, at decision block 1208, the repeater 130 waits for a message from the node 120C-120E, which will typically be an uplink data message having a payload that is a complete LoRaWAN™ PHYPayload of the MACPayload uplink type. As discussed herein, the repeater 130 may wait in a sleep mode for the message, or in the example embodiment, since the repeater 130 and node 120C-120E are in an active communication session, the repeater 130 may stay awake for a predetermined time waiting to receive the message from the node 120C-120E. Next, if at decision block 1208 the repeater 130 receives the message from the node 120C-120E, the method 1200 continues to block 1210, where the repeater 130 transmits an ACK message in response to the node 120C-120E. Next, the method 1200 continues to block 1212, where the repeater 130 prepares a LoRaWAN™ message to be bubbled up to application server 103 and then host server 106 through network 150 (via LoRaWAN™ gateway 110 and network server 104) utilizing LoRaWAN™ protocol, as discussed with respect to FIG. 4. Next, at block 1214, the repeater 130 sends the LoRaWAN™ MACPayload uplink message to the LoRaWAN™ gateway 110, which effectively forwards it on as discussed above.

At block 1216, the repeater 130 waits for a Class A MACPayload response delay, per LoRaWAN™ protocol. According to the example embodiment, the Class A window for receiving a MACPayload downlink message in response to a MACPayload uplink message is 1 second, and the receiving end-device, here repeater 130, listens for the MACPayload downlink message during a Class A response window of 40 µs, which is ±20 µs at the 1 second mark. Next, at decision block 1218, the repeater 130 waits and determines if it receives a LoRaWAN™ MACPayload downlink message from the LoRaWAN™ gateway 110 during the Class A response window. According to the exemplary embodiment, the repeater 130 is listening for the LoRaWAN™ MACPayload downlink message from the LoRaWAN™ gateway 110 from 1 second minus 20 µs to 1 second plus 20 µs, thus a 40 µs Class A window. In further embodiments, the Class A response window may be a different predetermined period of time. Next, if at decision block 1218 the repeater 130 does not receive a LoRaWAN™ MACPayload downlink message from the LoRaWAN™ gateway 110 within the Class A window, the method 1200 may advance to block 1220, where method 1200 ends as failing to receive a downlink. In some embodiments, such as if the Class A window is too short for a response to normally be received, the method show in FIG. 10 can be used to communicate with the node 120C-120E through Class B (instead of the remaining steps in FIG. 12). However, if at decision block 1218 the repeater 130 receives a LoRaWAN™ MACPayload downlink message from the LoRaWAN™ gateway 110 within the Class A window, the method 1200 proceeds to block 1222 such that, based only upon the timing of that message receipt, the repeater 130 identifies and hails the node 120C-120E from which it received earlier MACPayload uplink message. As with a similar process described with respect to step 922 above, according to an exemplary embodiment, the repeater 130 does not need to read any portion of the downlink message to identify the intended node 120C-120E for a MACPayload downlink message from the LoRaWAN™ gateway 110 after a Class A uplink message was transmitted, as the repeater 130 may proceed under an assumption the downlink message received within the Class A window is for the node 120C-120E that sent the uplink message (~1 second before). Thus, in this exemplary embodiment, the repeater 130 would not need to read and/or decode any portion of the LoRaWAN™ message, as it would only need to simply pass on (with an RFV4 wrapping, according to the RFV4 hailing protocol) the MACPayload downlink message to the particular node 120C-120E, or in other examples, whichever secondary format and protocol is being used between the repeater 130 and the node 120C-120E.

Next, after the repeater 130 hails node 120C-120E at block 1222, the method 1200 continues to decision block 1224, where the repeater 130 determines if it received a hail response from the node 120C-120E, and continues to hail the node 120C-120E at block 1222 until it receives a hail response, as shown in FIG. 12. Once the repeater 130 receives a hail response from node 120C-120E at block 1224, next at block 1226, the repeater 130 encapsulates (converts) the LoRaWAN™ MACPayload downlink message from the LoRaWAN™ gateway 110 into a node format. Next, at block 1228, the repeater 130 transmits the node message to the node 120C-120E, and at decision block 1230, the repeater 130 waits until it receives an ACK message from the node 120C-120E. If at decision block 1230 the repeater 130 receives an ACK message, the repeater 130 then passes the ACK message to the application server 103 via the LoRaWAN™ gateway 110 and network server 104 utilizing a LoRaWAN™ protocol at block 1232. Method 1200 then proceeds to end block 1234.

Figure 13:
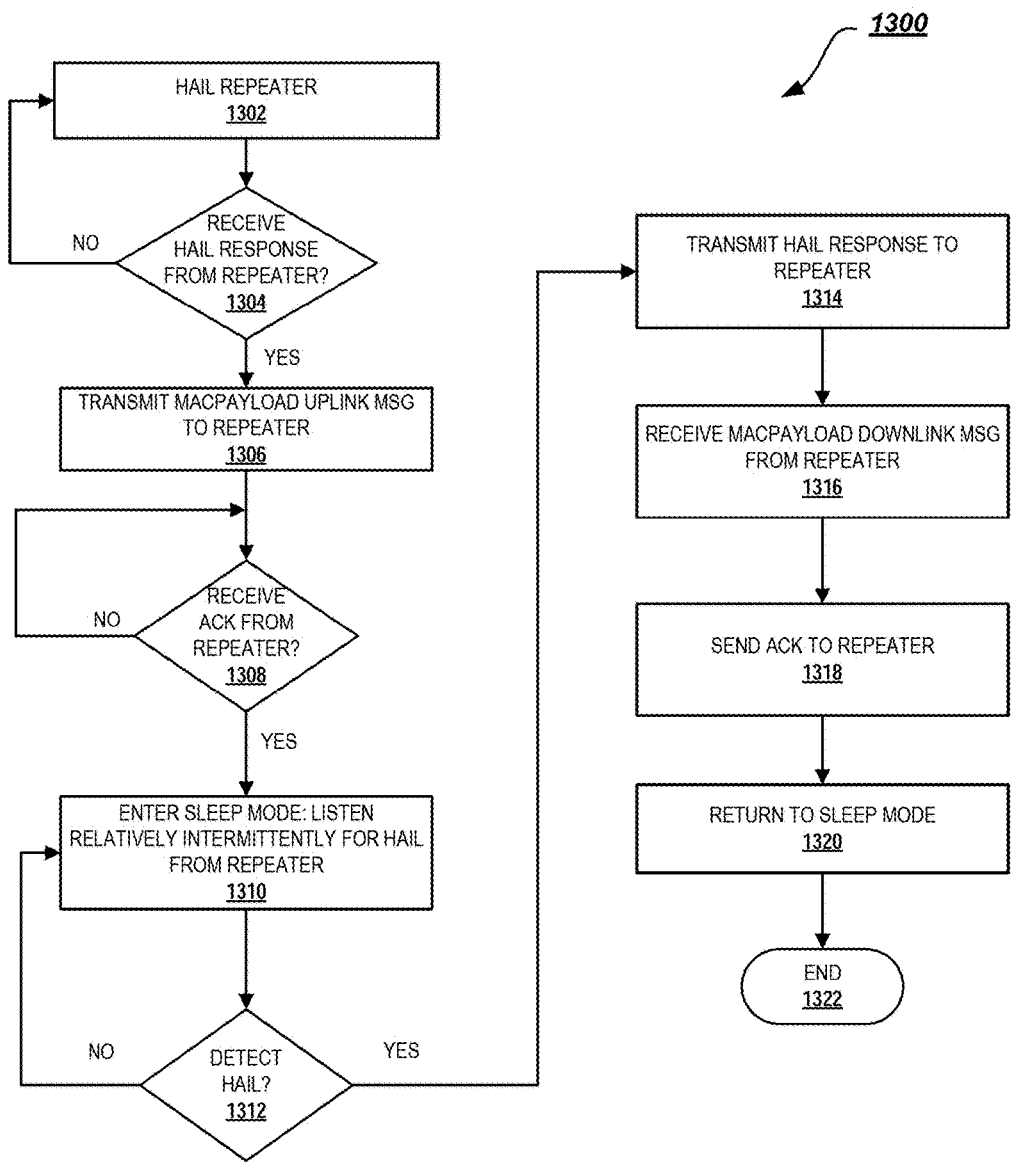
FIG. 13 illustrates a flow chart diagram of a method of a node sending a message to a repeater and receiving a message from a repeater, utilizing an RFV4 protocol between the node and the repeater in a communication system, according to examples of the present disclosure.

FIG. 13 illustrates a flow chart diagram of an exemplary method 1300 of a node 120C-120E sending a MACPayload uplink message to a repeater 130 and receiving a MACPayload downlink message from the repeater 130 utilizing RFV4 protocol between the node and the repeater, as discussed above. Method 1300 begins at block 1302, where a node 120C-120E will hail the repeater 130 in order to ultimately get a message effectively delivered to the host server 106. Next, at decision block 1304, the node 120C-120E determines if it has received a hail response from the repeater 130. If no response from the repeater 130, the node 120C-120E will return to block 1302 and continue to hail the repeater 130 until the node 120C-120E receives a hail response. In some embodiments, the node 120C-120E will time out and go to sleep mode if no hail response is received either after certain number of hail attempts, or a predetermined time limit has been reached. Once a hail response from the repeater 130 is received by the node 120C-120E, method 1300 continues to block 1306, where the node 120C-120E transmits a MACPayload uplink message to the repeater 130. Next, at decision block 1308, the node 120C-120E waits for an ACK from repeater 130. If no ACK is received immediately the node 120C-120E continues to wait. According to some embodiments, if an ACK is not received from the repeater 130 after a predetermined amount of time, the node 120C-120E may enter a sleep mode, or may return to block 1302 (line not shown) and hail the repeater 130 again to restart the join procedure. Once an ACK is received from the repeater 130, the node 120C-120E, at block 1310, enters a sleep mode, where the node 120C-120E listens relatively intermittently for a hail from the repeater 130. At decision block 1312, the node 120C-120E determines if it detects a hail from the repeater 130, if not, the node 120C-120E returns to a sleep mode. If a hail is detected, then at block 1314, the node 120C-120E transmits a hail response to the repeater 130 and waits until the node 120C-120E receives a MACPayload downlink message from the repeater 130 at block 1316. Next, at block 1318, the node 120C-120E sends an ACK to the repeater 130. Finally, at block 1320, the node 120C-120E returns to a sleep mode and then the method 1300 proceeds to end block 1322.

Figure 14:
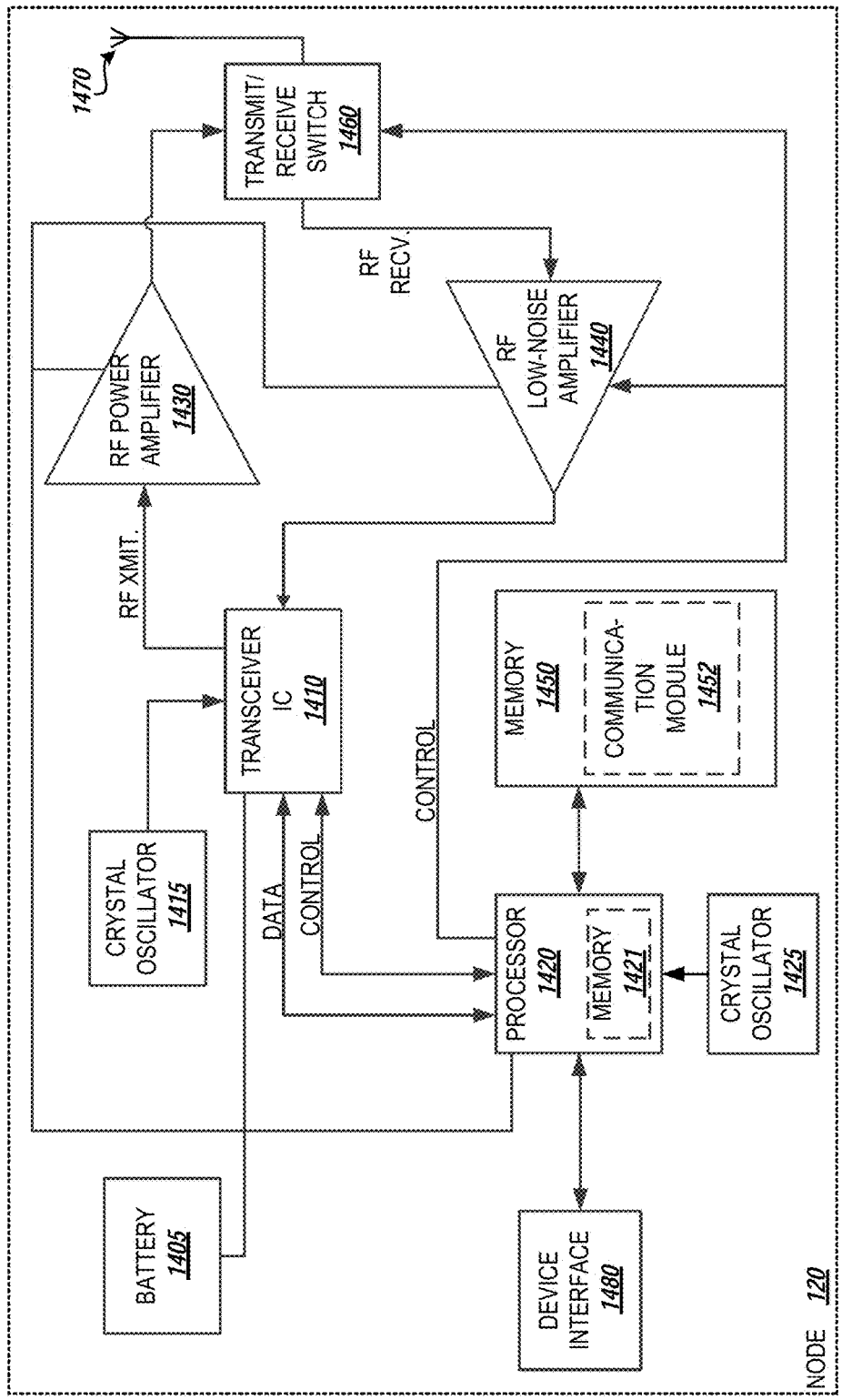
FIG. 14 is a block diagram of a node, according to certain embodiments described herein.

FIG. 14 shows a block diagram of components of an illustrative node 120 configured for RF communication in AMI networks. The node 120 may allow data to and from devices in the communication system 100, such as water, gas, or electrical meters, remotely controlled valves, flow nodes, leak detection devices, repeaters 130, and the like, to be communicated over the wireless AMI networks via communication protocols such as an RFV4 protocol, and a LoRaWAN™ protocol. For example, the node 120 may be implemented in or connected to a water meter in order to receive commands (such as to control a valve) and transmit usage data as well as, in some implementations, audio recording data to the host server 106 for leak detection. According to an example embodiment, the node 120 is configured to communicate via an RFV4 protocol with the repeater 130 which in turn communicates to the LoRaWAN™ gateway 110, as described herein, and the node 120 is also configured to communicate directly to a LoRaWAN™ gateway 110 via a LoRaWAN™ protocol. According to various embodiments, the node 120 may be configured for communication on various radio network topologies, including star, hybrid-star, peer-to-peer, and mesh, among others.

The node 120 may include at least one battery 1405 that powers a transceiver integrated circuit (IC) 1410, a processor 1420 having a built-in memory 1421, an RF power amplifier 1430, an RF low-noise amplifier 1440, a memory 1450, and other components. Memory 1450 is an "external" memory in the sense that it is separate from, and not contained within, another node component, unlike built-in memory 1421, for example. References to "external" memory herein are intended to refer to memory of the configuration illustrated in FIG. 14 at 1450. Other embodiments include nodes with fewer elements, e.g., nodes without power amplifiers or low noise amplifiers, among others. Crystal oscillators 1415 and 1425 are connected to the transceiver IC 1410 and the processor 1420, respectively. The node 120 further includes a transmit/receive switch 1460 and antenna 1470. The processor 1420 may be a microprocessor, a microcontroller, a field-programmable gate array (FPGA), or the like. The processor 1420 and the transceiver IC 1410 may include both a two-way data and a two-way control line. In some embodiments, the processor 1420 includes a control line to each of the RF low-noise amplifier 1440 and the transmit/receive switch 1460. The processor 1420 may also be connected to the memory 1450 by a two-way data line.

The built-in memory 1421 and external memory 1450 may each comprise a processor-readable storage medium for storing processor-executable instructions, data structures and other information. The built-in memory 1421 and external memory 1450 may include a non-volatile memory, such as read-only memory (ROM) and/or FLASH memory, and a random-access memory (RAM), such as dynamic random access memory (DRAM) or synchronous dynamic random access memory (SDRAM). The built-in memory 1421 and external memory 1450 may store firmware that comprises commands and data necessary for the nodes 120, LoRaWAN™ gateways 110, and repeaters 130 to communicate with other devices in the communication system 100 as well as perform other operations of the nodes. According to some embodiments, the external memory 1450 may store a communication module 1452 comprising processor-executable instructions that, when executed by the processor 1420, perform at least portions of the method 1100 for joining a LoRaWAN™ network through a repeater 130 via RFV4 protocol, or directly through a LoRaWAN™ gateway 110 via LoRaWAN™ protocol (FIG. 11), as described herein, as well as method 1300 of FIG. 13. In some embodiments, the communication module 1452 can communicate with the LoRaWAN™ gateway 110 via one or more antennas 1470, communicating at within one or more industrial, scientific, and medical (ISM) bands, such as 915 MHz in the United States, 868 MHz/433 MHz in Europe, 430 MHz in Australia, 923 MHz in Japan, etc., for example, in accordance with the particular protocol and/or particular implementation location. In some embodiments, the communication module 1452 can be configured in accordance with various operating region requirements. In some embodiments, the node 120 can transmit and receive data via a long range, wide area network, for example, in accordance with a LoRa™ modulation protocol provided by SEMTECH, or in accordance with the LoRaWAN™ specification provided by the LoRa Alliance™. In some embodiments, the communication module 1452 includes a GFSK or FSK link capability. In some embodiments, the communication module 1452 can communicate via any one of IEEE 802.11, Wi-Fi, cellular, 3G or 4G LTE networks, LAN, WAN, wired or wireless networks, etc.

In addition to the memory 1450, the node 120 may have access to other processor-readable media storing program modules, data structures, and other data described herein for accomplishing the described functions. It will be appreciated by those skilled in the art that processor-readable media can be any available media that may be accessed by the processor 1420 or other computing system, including processor-readable storage media and communications media. Communications media includes transitory signals. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM (EPROM), electrically-erasable programmable ROM (EEPROM), FLASH memory or other solid-state memory technology, compact disc ROM (CD-ROM), digital versatile disk (DVD), high definition DVD (HD-DVD), BLU-RAY or other optical storage, magnetic cassettes, magnetic tape, magnetic disk storage or other magnetic storage devices and the like.

According to some embodiments, the processor 1420 may be further connected to other components of the node 120 through a device interface 1480. In some embodiments, the device interface 1480 may connect to a metering component, such as a water meter, a gas meter, or an electricity meter, that allows the meter to provide usage data to the host server 106 through the communication system 100. In further embodiments, the device interface 1480 may connect to nodes or detection components, such as a leak detection device. In still further embodiments, the device interface 1480 may connect to a control component, such as an electronically actuated water valve, that allows the host server 106 and/or other devices in the communication system 100 to control aspects of the utility provider's infrastructure. In some embodiments, the node 120 may be connected to one or more sensors via one or more wired or wireless connections. For example, the connections may include, but are not limited to, one or more of RFV4 protocol, LoRaWAN™ protocol, Bluetooth, etc., and any protocols or standards discussed herein. In some embodiments, the node 120 may pull data from a sensor, and in some embodiments, the sensor may push data to the node 120. For example, the node 120 may query a sensor to read one or more water meters associated with the sensor, or the node 120 may receive data transmitted by the sensor to the node 120. These examples are not meant to be limiting, and those of skill in the art will recognize that alternative device components that may be interfaced with the node 120 through the device interface 1480. For example, the device interface 1480 may connect to a control component (valve actuator) and a data reading port (water meter readings) at the same time.

It will be appreciated that the structure and/or functionality of the node 120 may be different than that illustrated in FIG. 14 and described herein. For example, the transceiver IC 1410, processor 1420, RF power amplifier 1430, RF low-noise amplifier 1440, memory 1450, crystal oscillators 1415, 1425, device interface 1480 and other components and circuitry of the node 120 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 120 may not include all of the components shown in FIG. 14, may include other components that are not explicitly shown in FIG. 14 or may utilize an architecture completely different than that shown in FIG. 14.

In some embodiments, the repeater 130 has similar hardware elements as those shown in FIG. 14 for the node 120, with a larger battery and programming changes to be consistent with the functions disclosed herein. In addition, some implementations do not include the device interface 1480. Other implementations include parallel transmitter/receiver circuitry to simultaneously communicate through the RFV4 and LoRaWAN™ protocols. Likewise, the variations mentioned above regarding common integrated circuit packages, etc., are also applicable to the repeater 130.

Figure 15:
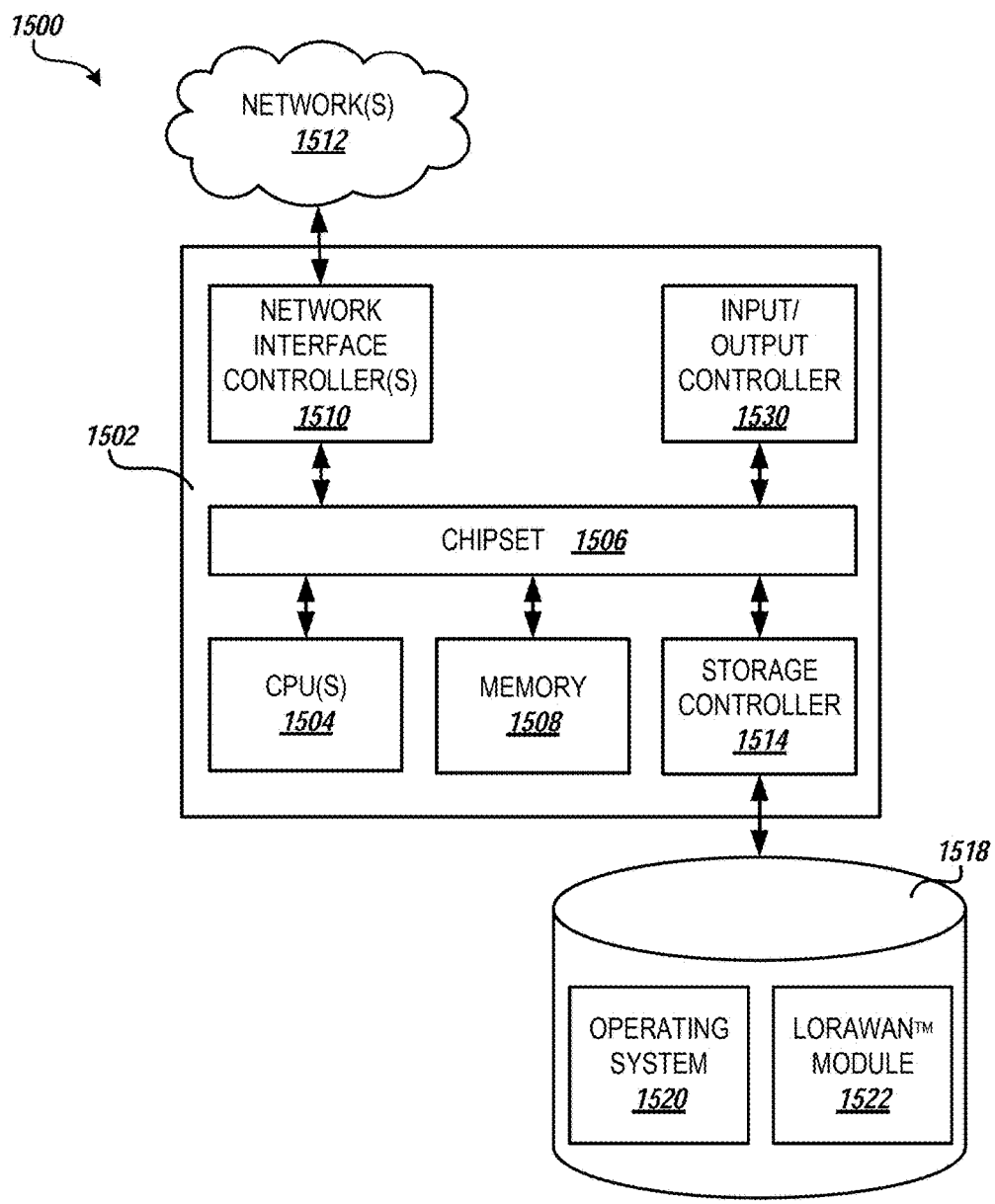
FIG. 15 is a block diagram showing an example computer architecture for a computer capable of executing the software components described herein for the sending of messages to nodes and for the processing of responses received from the nodes on a network utilizing a LoRaWAN™ protocol, according to embodiments described herein.

FIG. 15 shows an example computer architecture 1500 for a computer 1502 capable of executing the software components described herein for the sending messages to downlink devices, and for the processing of responses received from the downlink devices. The computer architecture 1500 (also referred to herein as a "server) shown in FIG. 15 illustrates a server computer, workstation, desktop computer, laptop, or other computing device, and may be utilized to execute any aspects of the software components presented herein described as executing on the host server 106 (FIG. 1), or other computing platform. The computer 1502 preferably includes a baseboard, or "motherboard," which is a printed circuit board to which a multitude of components or devices may be connected by way of a system bus or other electrical communication paths. In one illustrative embodiment, one or more central processing units (CPUs) 1504 operate in conjunction with a chipset 1506. The CPUs 1504 can be programmable processors that perform arithmetic and logical operations necessary for the operation of the computer 1502.

The CPUs 1504 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1506 provides an interface between the CPUs 1504 and the remainder of the components and devices on the baseboard. The chipset 1506 may provide an interface to a memory 1508. The memory 1508 may include a random access memory (RAM) used as the main memory in the computer 1502. The memory 1508 may further include a computer-readable storage medium such as a read-only memory (ROM) or non-volatile RAM (NVRAM) for storing basic routines that that help to startup the computer 1502 and to transfer information between the various components and devices. The ROM or NVRAM may also store other software components necessary for the operation of the computer 1502 in accordance with the embodiments described herein.

According to various embodiments, the computer 1502 may operate in a networked environment using logical connections to remote computing devices through one or more networks 1512, such as the LoRaWAN™ network described herein, a local-area network (LAN), a wide-area network (WAN), the Internet, or any other networking topology known in the art that connects the computer 1502 to the devices and other remote computers. The chipset 1506 includes functionality for providing network connectivity through one or more network interface controllers (NICs) 1510, such as a gigabit Ethernet adapter. For example, the NIC 1510 may be capable of connecting the computer 1502 to other computer devices in the utility provider's systems. It should be appreciated that any number of NICs 1510 may be present in the computer 1502, connecting the computer to other types of networks and remote computer systems beyond those described herein.

The computer 1502 may be connected to at least one mass storage device 1518 that provides non-volatile storage for the computer 1502. The mass storage device 1518 may store system programs, application programs, other program modules, and data, which are described in greater detail herein. The mass storage device 1518 may be connected to the computer 1502 through a storage controller 1514 connected to the chipset 1506. The mass storage device 1518 may consist of one or more physical storage units. The storage controller 1514 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 1502 may store data on the mass storage device 1518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1518 is characterized as primary or secondary storage, or the like. For example, the computer 1502 may store information to the mass storage device 1518 by issuing instructions through the storage controller 1514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1502 may further read information from the mass storage device 1518 by detecting the physical states or characteristics of one or more particular locations within the physical storage units.

The mass storage device 1518 may store an operating system 1520 utilized to control the operation of the computer 1502. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1518 may store other system or application programs and data utilized by the computer 1502, such as a LoRaWAN™ module 1522 utilized by the computer to manage communications in a communication network utilizing LoRaWAN™ protocol, as described herein.

In some embodiments, the mass storage device 1518 may be encoded with computer-executable instructions that, when loaded into the computer 1502, transforms the computer 1502 from being a general-purpose computing system into a special-purpose computer capable of implementing the embodiments described herein. These computer-executable instructions transform the computer 1502 by specifying how the CPUs 1504 transition between states, as described above. According to some embodiments, from the host server 106 perspective, the mass storage device 1518 stores computer-executable instructions that, when executed by the computer 1502, perform portions of the method 1000 of managing communications to a node 120 in a communication network utilizing a LoRaWAN™ protocol with or without a repeater 130, as described herein. In further embodiments, the computer 1502 may have access to other computer-readable storage medium in addition to or as an alternative to the mass storage device 1518. For example, according to some embodiments, from the join server 102 perspective, the mass storage device 1518 stores computer-executable instructions that, when executed by the computer 1502, perform portions of the method 800 of managing a join procedure with a repeater 130, portions of the method 900 of managing a join procedure with a node 120C-120E and a repeater 130, and portions of the method 1100 of managing a join procedure with a node 120C-120E and a repeater 130, as described herein with regard to FIG. 11.

The computer 1502 may also include an input/output controller 1530 for receiving and processing input from a number of input devices, such as a keyboard, a mouse, a touchpad, a touch screen, an electronic stylus, or other type of input device. Similarly, the input/output controller 1530 may provide output to a display device, such as a computer monitor, a flat-panel display, a digital projector, a printer, a plotter, or other type of output device. It will be appreciated that the computer 1502 may not include all of the components shown in FIG. 15, may include other components that are not explicitly shown in FIG. 15, or may utilize an architecture completely different than that shown in FIG. 15.

Various other modifications are contemplated as being within the scope of the present disclosure. Some implementations of the present disclosure include having the host server 106 send a message intended only for the repeater 130 that simply instructs the repeater 130 to send a message to a particular node 120C-120E that instructs that particular node 120C-120E to start the communication process and have that particular node 120C-120E send a Class A message to the host server 106. This implementation can avoid the need to route Class B messages to the nodes 120C-120E, and instead relying only on the timing of the response windows for Class A messages. According to this implementation, the response may need to be queued up at the network server 104 and/or LoRaWAN™ gateway 110. In a further implementation, if immediate communication is not needed by the host server 106 from the node 120A-120E, the host server 106 can queue a message up for a particular node 120A-120E at the LoRaWAN™ gateway 110 or network server 104, so when the node 120A-120E regularly reports to the network (once a day, once an hour, etc.) the message will be ready to be delivered to any one particular node 120A-120E.

In some embodiments, the communication system 100 may operate in accordance with one or more International Telecommunications Union (ITU) Regions. In some embodiments, the communication system 100 is operable in ITU Region 1 (e.g., EU868 MHz ISM Band (863 to 870 MHz), including Europe, Africa, the Middle East, and the former USSR); in some embodiments, the communication system 100 is operable in ITU Region 2 (US915 MHz ISM Band (902 to 928 MHz), including North and South America); and in some embodiments, the communication system 100 is operable in ITU Region 3 (China 779 to 787 MHz ISM Band, which allows for operation in most of Asia, Indonesia, India, and Australia; AS923 915-928 MHz ISM Band, which allows for operation in Japan, Hong Kong, Taiwan, Singapore, Thailand, and others). To adapt the communication system 100 disclosed herein to different regions internationally (ITU Region 1, 2, or 3), some embodiments include changing of the RF (radio frequency) components (e.g., surface acoustic wave (SAW) filter, lumped element matching, antenna, etc.) and software reconfiguration. Generally speaking, the communication system 100 can be adopted to any frequency, including between 400 MHz to 960 MHz, and can be configured for either LoRa™ (long range wide area network, such as in accordance with the LoRa Alliance™), FSK, GFSK, on-off keying (OOK) modulation, or any low power wide area network modulation techniques. According to one embodiment, repeater 130 to nodes 120C-120E communications occur on 500 Khz channels in order to comply with the United States Federal Communications Commission (FCC) rules for the ISM band.

Embodiments of the methods and systems are described above with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic as part of the processing elements implementing the functions specified in the flowchart block or blocks, which describe and reference specific algorithms and inherent structure for accomplishing the functions as described and further explained herein.

These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks.

Accordingly, blocks of the block diagrams and flowchart illustrations support combinations of elements for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by general purpose or special purpose hardware-based systems that perform the specified functions or steps, or combinations of special purpose hardware and instructions.

Moreover, the above description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the above description is provided as illustrative of the principles of the present disclosure and not in limitation thereof. In addition, as used throughout, the singular forms "a," "an" and "the" include plural referents unless the context clearly dictates otherwise. Thus, for example, reference to "a panel" can include two or more such panels unless the context indicates otherwise. Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances. As used herein, the terms "optional" or "optionally" mean that the subsequently described event or circumstance may or may not occur, and that the description comprises instances where said event or circumstance occurs and instances where it does not. It is further understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described disclosure, nor the claims which follow.

That which is claimed is:

1. A method of a repeater joining a node of a plurality of nodes through a gateway to a long-range wireless wide area network, the method comprising steps of:
   receiving at the repeater a join request message from the node;
   transmitting at least a portion of the join request message on behalf of the node from the repeater to a gateway;
   receiving at the repeater from the gateway a join accept message regarding the node;
   identifying the node at the repeater based upon timing between the steps of the repeater transmitting the at least a portion of the join request message and receiving the join accept message; and
   transmitting at least a portion of the join accept message from the repeater to the node identified by the repeater.

2. The method of claim 1, wherein the join request message includes LoRaWAN™ join request information embedded in a communication protocol other than a LoRaWAN™ communication protocol.

3. The method of claim 1, further comprising steps of, prior to the step of receiving at the repeater the join request message from the node, generating a join request message on behalf of the repeater, transmitting the join request message on behalf of the repeater from the repeater to the gateway, and receiving a join accept message on behalf of the repeater from the gateway.

4. The method of claim 1, further comprising steps of, prior to the step of receiving at the repeater the join request message from the node, receiving at the repeater a hail message from the node and transmitting to the node a hail response message.

5. The method of claim 1, wherein the join request message is configured to be communicated to a join server, and wherein the method further comprises steps of receiving messages from the node to be communicated through the gateway to an application server and monitoring a time beacon from the gateway to receive messages from the application server through the gateway at predetermined times.

6. A method of managing communications through a repeater between a plurality of nodes and at least one gateway in a long-range wireless wide area network (LoRaWAN), the method comprising steps of:
   receiving at the repeater from a node of the plurality of nodes a message with a payload for a server;
   transmitting to the gateway a message including, as its physical layer payload, the payload of the message from the node for the server; and receiving at the repeater from the gateway a message with information for the node of the plurality of nodes at a known synchronized time;

identifying the node of the plurality of nodes based only on timing if the message received from the gateway is received within a predetermined time window after the repeater transmitted the message to the gateway; and identifying the node of the plurality of nodes based on an interpretation by the repeater of content of the message received from the gateway if the message received from the gateway is not received within the predetermined time window;

wherein the repeater communicates with the node of the plurality of nodes at asynchronous times through bidirectional hailing.

7. The method of claim 6, wherein the repeater communicates with the gateway through a LoRaWAN™ protocol, and wherein the node of the plurality of nodes communicates via the repeater with the gateway through a protocol other than the LoRaWAN™ protocol.

8. A method of managing communications through a repeater between a plurality of nodes and at least one gateway in a long-range wireless wide area network (LoRaWAN™), the method comprising steps of:

receiving at the repeater from a node of the plurality of nodes a message with a payload for a server;

transmitting to the gateway a message including, as its physical layer payload, the payload of the message from the node for the server;

joining the long-range wireless wide area network, by the repeater, as a LoRaWAN™ Class B device;

joining the long-range wireless wide area network, by the node, as a LoRaWAN™ Class A device; and hailing the node, by the repeater, responsive to receiving messages from the gateway for the node in both Class A and Class B timing;

wherein the repeater communicates with the gateway through a LoRaWAN™ protocol, and wherein the node of the plurality of nodes communicates via the repeater with the gateway through a protocol other than the LoRaWAN™ protocol.

9. A method of managing communications through a repeater between a plurality of nodes and at least one gateway in a long-range wireless wide area network (LoRaWAN), the method comprising steps of:

receiving at the repeater from a node of the plurality of nodes a message with a payload for a server;

transmitting to the gateway a message including, as its physical layer payload, the payload of the message from the node for the server;

receiving at the repeater from the gateway a message with information for the node of the plurality of nodes;

identifying the node of the plurality of nodes based only on timing if the message received from the gateway is received within a predetermined time window after the repeater transmitted the message to the gateway; and identifying the node of the plurality of nodes based on an interpretation by the repeater of the content of the message received from the gateway if the message received from the gateway is not received within the predetermined time window.

10. The method of claim 9, wherein the step of identifying the node of the plurality of nodes based on an interpretation by the repeater of content of the message includes decrypting the message in a manner that leaves a portion of the message encrypted for the node to decrypt.

11. A repeater for communicating between a gateway and a plurality of nodes in a long-range wireless wide area network, the repeater comprising:

logic configured to receive at the repeater a join request message from a node of the plurality of nodes;

logic configured to transmit at least a portion of the join request message on behalf of the node from the repeater to a gateway;

logic configured to receive at the repeater from the gateway a join accept message regarding the node;

logic configured to identify the node at the repeater based upon timing between the steps of the repeater transmitting the at least a portion of the join request message and receiving the join accept message; and logic configured to transmit at least a portion of the join accept message from the repeater to the node identified by the repeater.

12. The repeater of claim 11, further comprising:

logic configured to receive through the gateway a message with information for the node in accordance with a first communication protocol;

logic configured to identify by the repeater the node to which the information is directed; and logic configured to transmit a message with at least a portion of the information to the identified node in accordance with a second communication protocol that is different from the first communication protocol.

13. The repeater of claim 12, wherein the first communication protocol is a communication protocol with synchronizing time beacons, and wherein the second communication protocol is an asynchronous communication protocol with bidirectional hailing.

14. The repeater of claim 12, wherein the first communication protocol is a LoRaWAN™ protocol, and wherein the second communication protocol is a communication protocol other than the LoRaWAN™ protocol.

15. The repeater of claim 12, wherein the logic configured to identify includes logic configured to identify the node based on timing of the receiving of the message from the gateway.

16. The repeater of claim 12, further comprising logic configured to, prior to receipt at the repeater of the message from the gateway, transmit to the gateway a message based upon a message received from the node, and wherein the logic configured to identify includes logic configured to determine that the message received from the gateway is received within a predetermined time window after the repeater transmitted the message to the gateway.

17. The repeater of claim 12, wherein the logic configured to identify includes logic configured to identify the node based upon interpreting a portion of the message received from the gateway.

18. The repeater of claim 12, wherein the logic configured to identify includes logic configured to decrypt a first portion of the message received from the gateway, and wherein the logic configured to transmit includes logic configured to transmit the message to the identified node with a second portion of the message received from the gateway that is encrypted.

19. The repeater of claim 12, further comprising logic configured to, prior to transmission of the message, send a hail message to the node and receive a hail response message from the node.

* * * * *